(12) United States Patent
Fukushige et al.

(10) Patent No.: US 10,547,261 B2
(45) Date of Patent: Jan. 28, 2020

(54) VARIABLE MAGNETIZATION MACHINE CONTROLLER

(71) Applicants: Nissan Motor Co., Ltd., Yokohama-shi, Kanagawa (JP); Wisconsin Alumni Research Foundation, Madison, WI (US)

(72) Inventors: Takashi Fukushige, Kanagawa (JP); Brent S. Gagas, Madison, WI (US); Chen-Yen Yu, Cupertino, CA (US); Robert D. Lorenz, Madison, WI (US)

(73) Assignees: Nissan Motor Co., Ltd., Yokohama (JP); Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 15/506,807

(22) PCT Filed: Aug. 29, 2014

(86) PCT No.: PCT/US2014/053350
§ 371 (c)(1),
(2) Date: Feb. 27, 2017

(87) PCT Pub. No.: WO2016/032508
PCT Pub. Date: Mar. 3, 2016

(65) Prior Publication Data
US 2017/0279392 A1 Sep. 28, 2017

(51) Int. Cl.
*H02P 21/06* (2016.01)
*B60L 15/02* (2006.01)
*H02P 21/22* (2016.01)
*H02P 101/45* (2016.01)

(52) U.S. Cl.
CPC ............ *H02P 21/06* (2013.01); *B60L 15/025* (2013.01); *H02P 21/22* (2016.02); *H02P 2101/45* (2015.01); *Y02T 10/643* (2013.01)

(58) Field of Classification Search
CPC .. Y02T 10/643; B60L 15/025; B60L 2220/14; H02P 21/06; H02P 21/22
See application file for complete search history.

(56) References Cited

U.S. PATENT DOCUMENTS 9,219,439 B2   12/2015  Sasaki et al.
2007/0046249 A1*  3/2007  Tomigashi ............. H02P 21/18
                                                      318/807
(Continued)

FOREIGN PATENT DOCUMENTS

CN   103988419 A   8/2014
JP   2000-148250 A  5/2000
(Continued)

OTHER PUBLICATIONS

Translation of WO-2009-084461 has been attached.*
(Continued)

*Primary Examiner* — Bickey Dhakal
*Assistant Examiner* — Zoheb S Imtiaz
(74) *Attorney, Agent, or Firm* — Global IP Counselors, LLP

(57) ABSTRACT

A variable magnetization machine control system comprising a controller configured to generate a reversely rotating d-axis/q-axis current vector trajectory during a change in a magnetization state of a variable magnetization machine to drive the variable magnetization machine at a predetermined speed while maintaining the driving voltage below a predetermined maximum magnitude.

16 Claims, 19 Drawing Sheets

(56) References Cited

U.S. PATENT DOCUMENTS

| | | | | |
|---|---|---|---|---|
| 2009/0261774 A1* | 10/2009 | Yuuki | H02K 1/2766 | 318/720 |
| 2014/0062353 A1* | 3/2014 | Oyobe | H02P 27/085 | 318/400.02 |
| 2014/0152207 A1* | 6/2014 | Sasaki | H02P 21/0089 | 318/400.02 |
| 2014/0253001 A1* | 9/2014 | Hinata | H02P 6/186 | 318/400.02 |
| 2014/0300305 A1* | 10/2014 | Itamoto | H02P 6/12 | 318/474 |
| 2015/0137648 A1* | 5/2015 | Kato | H02K 1/276 | 310/156.53 |

FOREIGN PATENT DOCUMENTS

| | | |
|---|---|---|
| JP | 2003-135883 A | 5/2003 |
| JP | 2004-9841 A | 1/2004 |
| JP | 2005-110354 A | 4/2005 |
| JP | 2006-200387 A | 8/2006 |
| JP | 2008-29148 A | 2/2008 |
| JP | 2008-43030 A | 2/2008 |
| JP | 2010-166701 A | 7/2010 |
| JP | 2010-213429 A | 9/2010 |
| JP | 2012-223021 A | 11/2012 |
| JP | 2012-239302 A | 12/2012 |
| WO | 2013/084461 A1 | 6/2013 |
| WO | WO-2009-084461 A1 * | 6/2013 |

OTHER PUBLICATIONS

Chen-Yen Yu et al., "Variable Flux Machine Torque Estimation and Pulsating Torque Mitigation during Magnetization State Manipulation," Energy Conversion Congress and Exposition, Sep. 2013, p. 852-859, IEEE, USA.

* cited by examiner

VARIABLE MAGNETIZATION MACHINE CONTROLLER

CROSS-REFERENCE TO RELATED APPLICATION

This application is a U.S. National stage of International Application No. PCT/JP2014/053350, filed Aug. 29, 2014, the entire contents of International Application No. PCT/JP2014/053350 are hereby incorporated herein by reference. Also, related subject matter is disclosed in International Application No. PCT/US2013/048562, filed on Jun. 28, 2013, and in International Application No. PCT/US2014/053354, filed on Aug. 29, 2014, the entire contents both of these International Applications being incorporated by reference herein.

BACKGROUND

Field of the Invention

The present invention generally relates to a variable magnetization machine controller. More particularly, the present invention relates to a controller that is able to reduce the voltage induced by a pulse current to control a variable magnetization machine, such as an electric motor or other type of variable flux machine, that is employed in an electric or hybrid electric vehicle, at the reduced voltage.

Background Information

Electric vehicles and hybrid electric vehicles (HEV) include an electric motor that operates as a drive source for the vehicle. In a purely electric vehicle, the electric motor operates as the sole drive source. On the other hand, an HEV includes an electric motor and a conventional combustion engine that operate as the drive sources for the vehicle based on conditions as understood in the art.

Electric vehicles and HEVs can employ an electric motor having variable magnetization characteristics as understood in the art. For example, the magnetization level of the motor can be increased to increase the torque generated by the motor. Accordingly, when the driver attempts to accelerate the vehicle to, for example, pass another vehicle, the motor control system can change the magnetization level to increase the torque output of the motor and thus increase the vehicle speed.

In a typical motor control system, an inverter applies the control voltage to the motor. As understood in the art, as the current pulse width is shortened, the ramp rate of the current pulse, such as the D-axis current pulse, will increase. Naturally, this current pulse will affect the voltage induced in the control system.

SUMMARY

However, at a high motor speed, the voltage induced in the control system by the pulse current can increase to a high voltage level. At this high voltage level, the inverter may be no longer capable of providing enough voltage to drive the motor at the desired speed. Accordingly, it is desirable to provide an improved motor control system for a variable magnetization machine, such as a variable magnetization motor or other type of variable flux machine for a vehicle, that is capable of reducing the voltage induced by a pulse current to a low enough level so that the inverter can provide a sufficient voltage to drive the variable magnetization machine even at a high speed.

In view of the state of the known technology, one aspect of a variable magnetization machine control system according to the disclosed embodiments comprises a controller configured to generate a reversely rotating d-axis/q-axis current vector trajectory during a change in a magnetization state of a variable magnetization machine to drive the variable magnetization machine at a predetermined speed while maintaining the driving voltage below a predetermined maximum magnitude.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
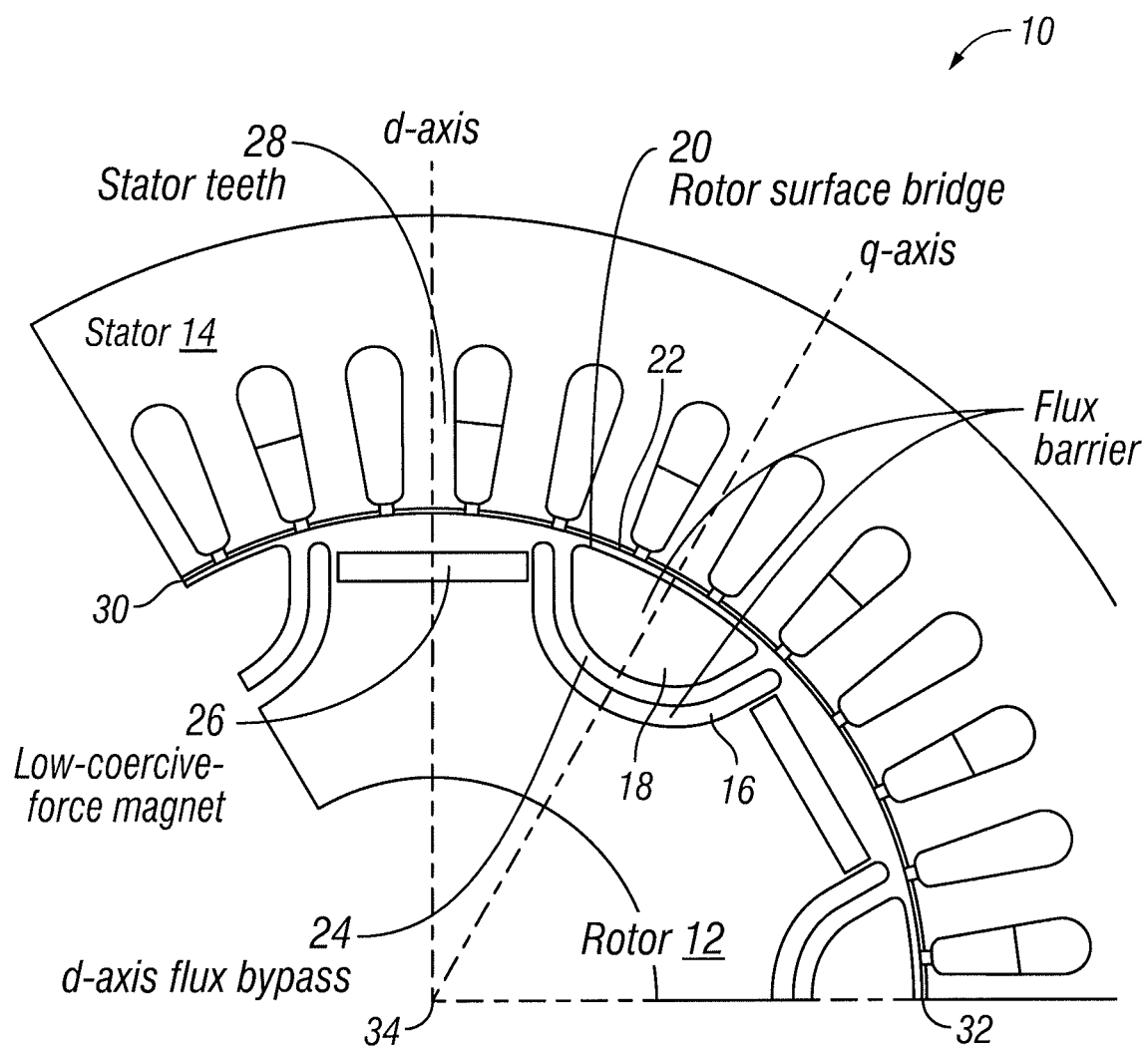
FIG. 1 is a partial cross-sectional schematic view of a variable magnetization machine according to a disclosed embodiment.

As shown in FIG. 1, a variable magnetization machine 10, which can also be referred to as a variable magnetization motor or other type of variable flux machine, includes a rotor 12 and a stator 14. As discussed herein, the terms variable magnetization machine and variable flux machine can be used synonymously to refer to the same type of machine. The variable magnetization machine 10 can be employed in any type of electric vehicle or HEV such as an automobile, truck, SUV and so on, and in any other type of apparatus as understood in the art. The rotor 12 and the stator 14 can be made of metal or any other suitable material as understood in the art.

In this example, the rotor 12 is configured to include a plurality of pairs of flux barriers 16 and 18, which can be configured as air gaps or can include any suitable type of insulating material as is conventional in the art. Although only one full pair and two partial pairs of the flux barriers 16 and 18 are shown, in this example, six pairs of flux barriers 16 and 18 can be spaced at 60 degree angles about the outer perimeter of the rotor 12. Naturally, the rotor 12 can include as many pairs of flux barriers 16 and 18 as deemed appropriate for the environment in which the variable magnetization machine 10 is employed. Also, as shown in this example, a q-axis of the motor passes through the center of a pair of flux barriers 16 and 18. However, the pairs of flux barriers 16 and 18 can be positioned at any suitable location with respect to the q-axis to achieve the operability of the embodiments discussed herein.

As further shown, a surface bridge 20, of the rotor 12 is present between the radially outward boundary of each flux barrier 18 and the outer circumference 22 of the rotor 12. Furthermore, a d-axis flux bypass 24 is present between each of the adjacent pairs of flux barriers 16 and 18. In this example, the surface bridges 20, and the d-axis flux bypasses 24 are made of the same material as that of the rotor 12. However, the surface bridges 20, and the d-axis flux bypasses 24 can be made of any suitable type of material as known in the art.

In addition, a plurality of low-coercive-force magnets 26 are spaced between adjacent pairs of flux barriers 16 and 18 about the circumference of the rotor 12. As indicated, each of these magnets 26 extend longitudinally in a perpendicular or substantially perpendicular direction with respect to portions of adjacent flux barriers 16. However, the magnets 26 can be configured in any suitable size and shape. Also, in this example, the rotor 12 includes 6 magnets 26 which are positioned between the 6 pairs of flux barriers 16 and 18 and spaced at 60 degree intervals in a circumferential direction about the rotor 12. However, the number of magnets 26 can change with respect to a change in the number of pairs of flux barriers 16 and 18. Furthermore, each magnet 26 can be configured as a plurality of magnets. In this example, a d-axis passes through a center of a magnet 26. However, the magnets 26 can be positioned at any suitable location with respect to the d-axis to achieve the operability of the embodiments discussed herein.

The stator 14 includes a plurality of stator teeth 28 and other components such as windings (not shown) which can be configured in any conventional manner. In this example, the stator teeth 28 are configured as wide stator teeth as known in the art. However, the stator teeth 28 can have any suitable size, and the stator 14 can include any number of stator teeth 28 to achieve the operability of the embodiments discussed herein. In this example, the stator teeth 28 are open to the inner circumference 30 of the stator 14, but can be closed if desired. Also, an air gap 32 is present between the outer circumference 22 of the rotor 12 and the inner circumference 30 of the stator 14 to enable the rotor 12 to rotate unrestrictedly or substantially unrestrictedly about an axis 34.

Figure 2:
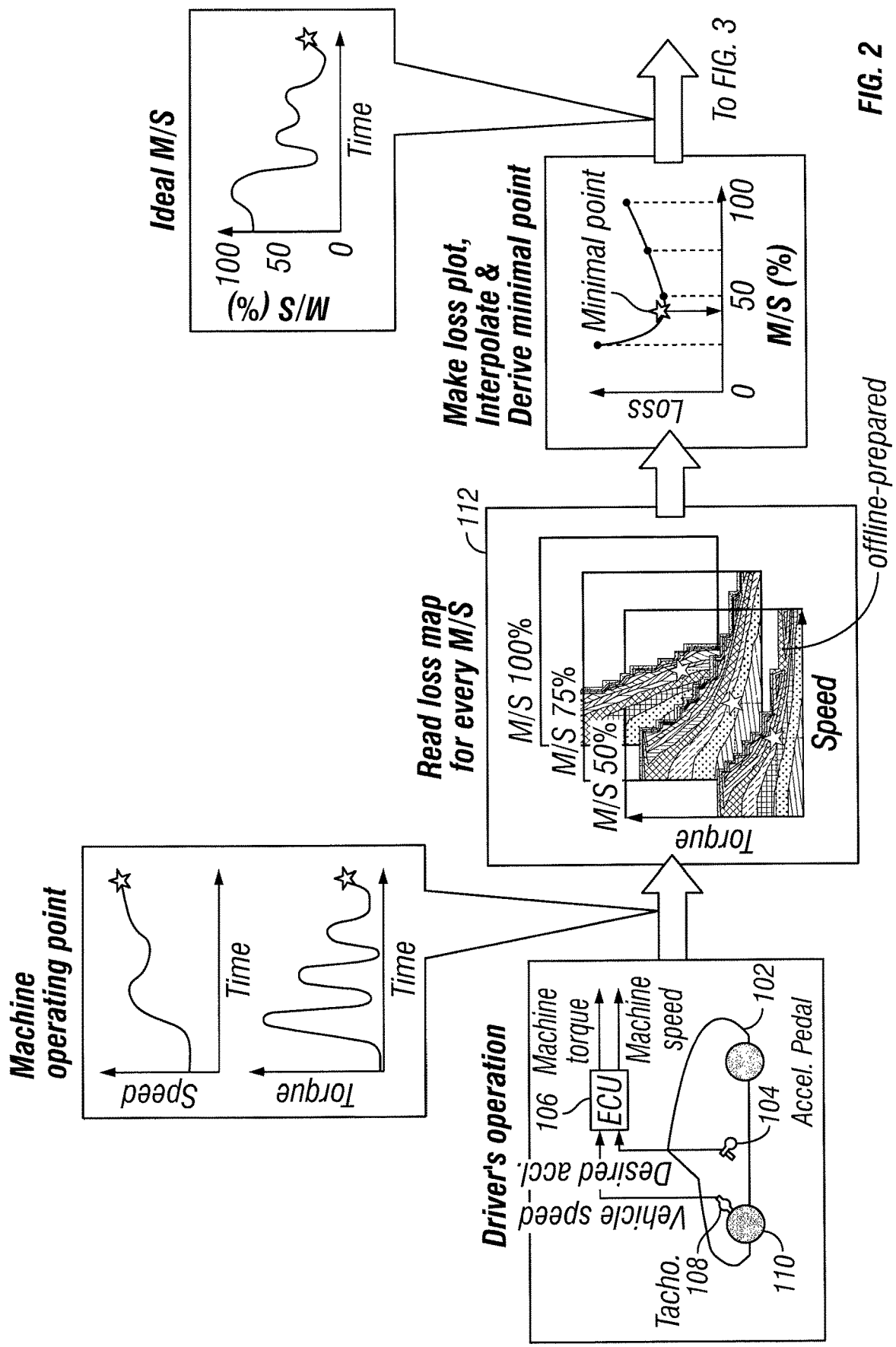
FIGS. 2 through 4 are diagrammatic views illustrating an example of components, including a controller according to the disclosed embodiments, that are employed in a vehicle to control a variable magnetization machine such as that shown in FIG. 1.
Figure 3:
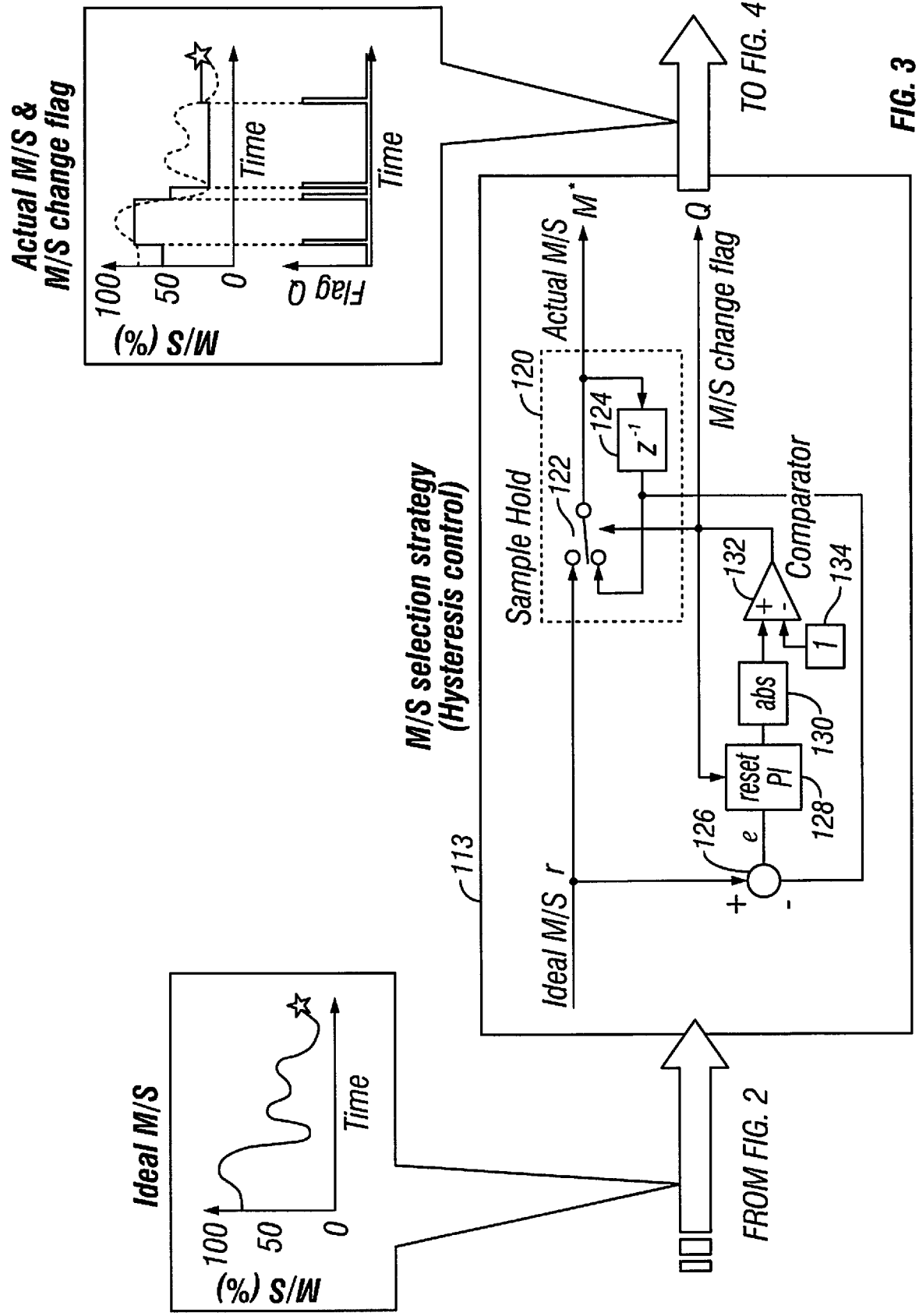
Figure 4:
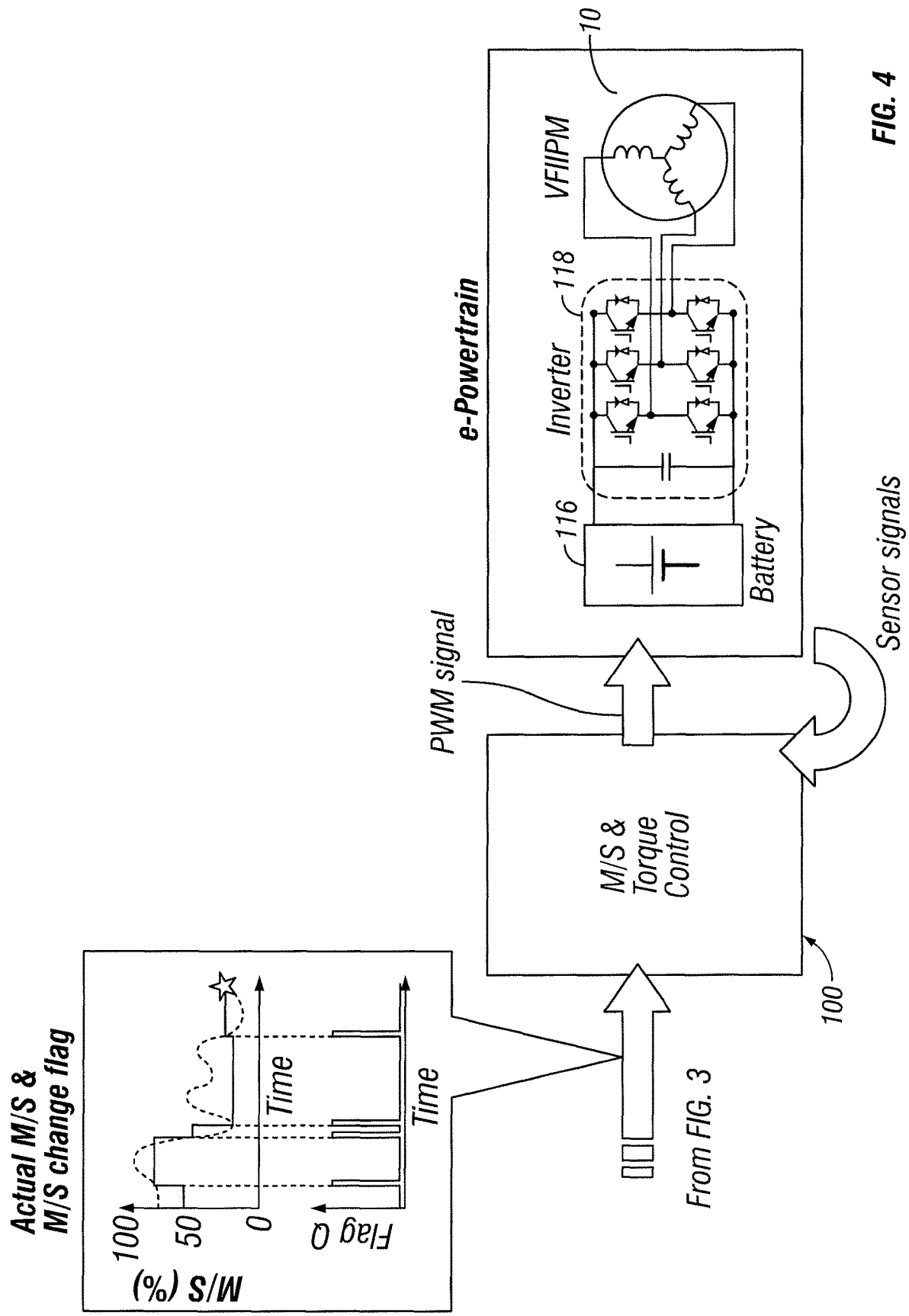

FIGS. 2 through 4 are diagrammatic views illustrating an example of the manner in which a controller 100 (FIG. 4) according to the disclosed embodiments is employed in a vehicle 102 to control the variable magnetization machine 10. The vehicle 102 can be an electric vehicle or HEV such as an automobile, truck, SUV or any other suitable type of vehicle. As understood in the art, when a driver presses the accelerator 104, an acceleration signal is input to a controller 106, such as an electronic control unit (ECU) or any other suitable type of controller. Also, a speed sensor 108, such as a tachometer or any other suitable type of sensor, senses the rotational speed of, for example, a drive wheel 110 of the vehicle 102 and provides a vehicle speed signal to the controller 106.

The controller 106 includes other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the controller 106 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. Furthermore, the controller 106 can communicate with the accelerator 104, the speed sensor 108 and the other components in the vehicle 102 discussed herein in any suitable manner as understood in the art. In addition, the components of the controller 106 need not be individual or separate components, and one component or module can perform the operations of multiple components or modules discussed herein. Also, each component can include a microcontroller as discussed above or multiple components can share one or more microcontrollers.

As further shown in FIG. 2, the controller 106 outputs signals to control the speed and the torque of the variable magnetization machine 10 to reach the appropriate machine operating state to achieve the desired vehicle acceleration as understood in the art. For instance, the controller 106 can access an appropriate loss map from among a plurality of previously prepared loss maps that can be stored in a memory 112. Each loss map can indicate respective loss characteristics for a respective magnetization state (M/S) as indicated. The controller 106 can then, for example, generate a loss plot which represents an amount of loss for each respective M/S and derive a minimal loss point as indicated. The controller 106 can therefore output a signal to control the variable magnetization machine 10 to achieve that ideal M/S.

As shown in FIG. 3, the signal representing the ideal M/S is input to an M/S selection strategy module 113 which performs hysteresis control and, as discussed in more detail below, outputs a signal representing the actual M/S signal (also referred to as a target magnetization state signal M* as discussed with below with regard to FIG. 7) and an M/S change flag signal Q. As shown in FIG. 4, the controller 100, which can be an M/S and torque controller, receives the signal representing the actual M/S signal and the M/S change flag signal Q, and outputs an M/S and torque control signal, such as a pulse width modulated (PWM) signal, to control the variable magnetization machine 10. That is, the controller 100 is coupled to an e-powertrain which includes, for example, a battery 116, an inverter arrangement 118, and the variable magnetization machine 10. In this example, inverter arrangement 118 can be, for example, a pulse width modulator (PWM) voltage inverter, or any other suitable type of inverter configuration as understood in the art.

As further shown in FIG. 3, the M/S selection strategy module 113 includes a sample and hold circuit 120 that includes a switch 122 and a z-transform component 124. The M/S selection strategy module 113 further includes a subtractor 126, a proportional-integral (PI) compensator 128, an absolute value circuit 130, a comparator 132 and a comparator input component 134.

The ideal M/S signal is input to the switch 122 of the sample and hold circuit 120 and the subtractor 126. The subtractor 126 subtracts a feedback signal from the ideal M/S signal and outputs an error signal to the PI compensator 128. As understood in the art, the PI compensator 128 removes a steady state error from the error signal and provides the error signal with the steady state error removed to the absolute value circuit 130 as a modified error signal. The absolute value circuit 130 outputs an absolute value of the modified error signal to the comparator 132. The comparator 132 also receives an input signal from the comparator input component 134. In this example, the input signal represents a value "1" but can be set to any suitable value to achieve the effects discussed herein.

The comparator 132 provides an output based on the modified error signal and the input signal to control switching of the switch 122 of the sample and hold circuit 120. The comparator 132 also provides the output as a reset signal to the PI compensator 128 as understood in the art. The comparator 132 further provides the output as an M/S change flag signal Q to the M/S changing current trajectory control module 114 of the controller 100 (see, e.g., FIGS. 7, 17 and 18) as discussed in more detail below.

As further shown, the z-transform component 124 provides a feedback of the actual M/S signal output by the sample and hold circuit 120 as a second input to the switch 122. The switch 122 outputs either the ideal M/S signal or the feedback signal from the z-transform component 124 as the actual M/S signal based on the state of the output signal provided by the comparator 132. Therefore, the components of the M/S selection strategy module 113 discussed above operate as a hysteresis control component that is configured to receive an ideal magnetization state signal, output an actual magnetization state signal based on the ideal magnetization state signal for control of a variable magnetization machine, and modify the actual magnetization state signal in accordance with an error value between the ideal magnetization state signal and the actual magnetization state signal. That is, when the error value results in the comparator 132 outputting a signal having a value that controls the switch 122 to output the modified signal from the z-transform component 124 as the actual M/S signal, the controller 100 in effect modifies the actual M/S signal in accordance with an error value between the ideal magnetization state signal and the actual magnetization state signal. Thus, the sample and hold circuit 120 (sample and hold component) that is configured to output the actual magnetization state signal and to modify the actual magnetization state signal in accordance with the error value. The M/S selection strategy module 113 configured to operate as the hysteresis control component is further configured to output the M/S change flag signal Q as a pulse signal in synchronization with the actual M/S signal such that the variable magnetization machine 10 is further controlled in accordance with this pulse signal.

Figure 5:
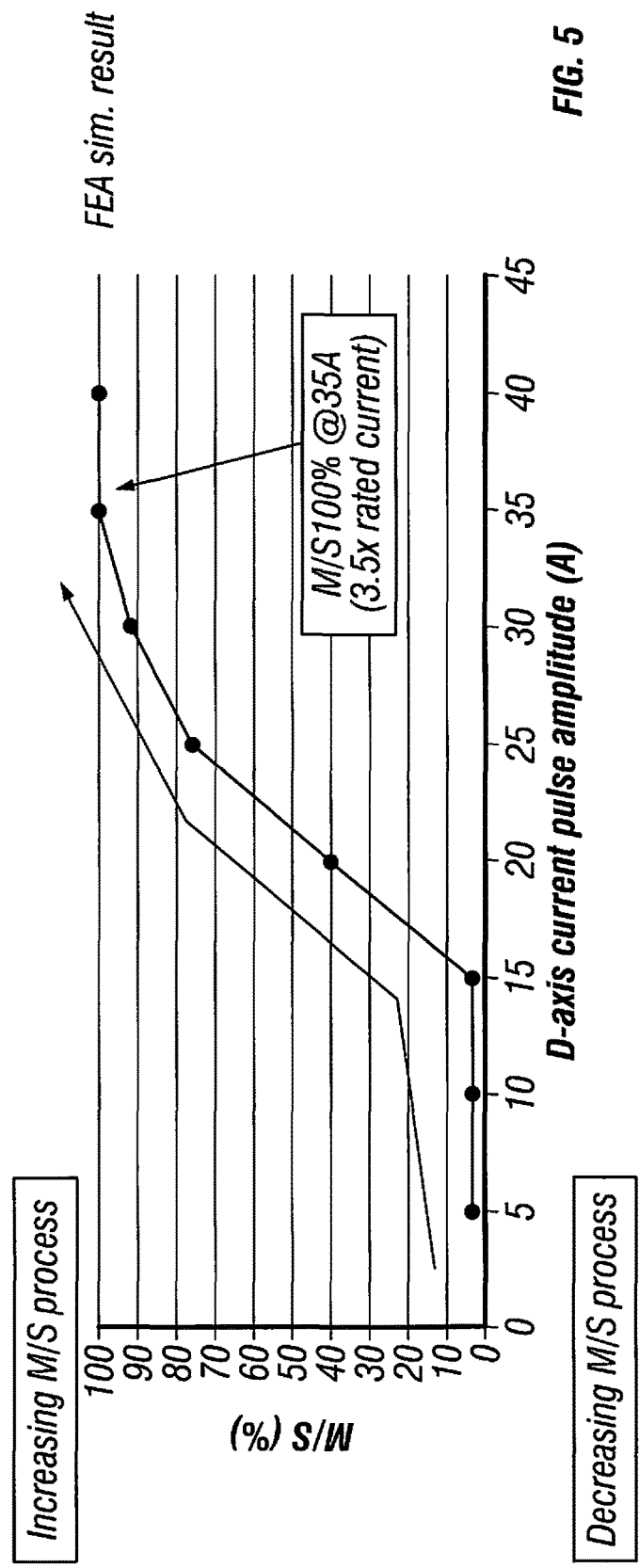
FIGS. 5 and 6 are graphs which illustrate an example of the relationship between the magnetization state (M/S) of the variable magnetization machine and the d-axis current pulse amplitude that are applied to the variable magnetization machine by the configuration shown in FIGS. 2 through 4 during a magnetization process and a demagnetization process.
Figure 6:
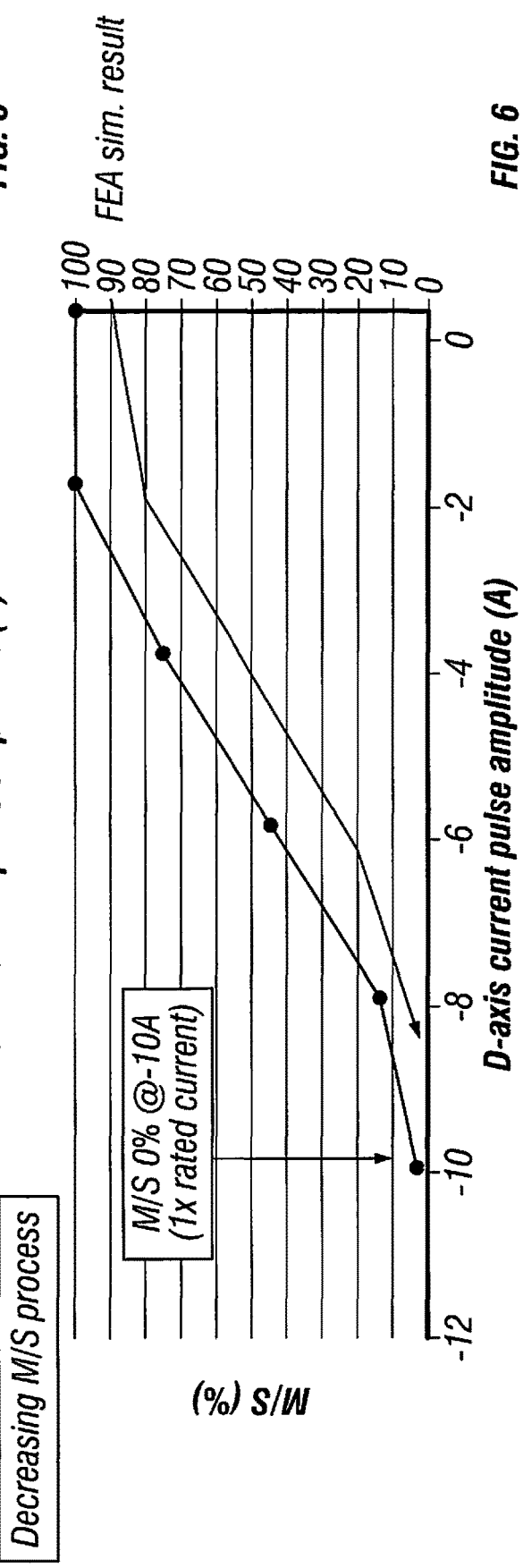

FIGS. 5 and 6 are graphs which illustrate an example of the relationship between the M/S and the d-axis current pulse that the controller 100, along with the battery 116 and the inverter arrangement 118, applies to the variable magnetization machine 10 during a magnetization process (FIG. 5) and a demagnetization process (FIG. 6). An example of components of the controller 100 will now be described with regard to FIG. 7. As will be appreciated from the description of this embodiment and the other embodiments set forth herein, the q-axis current is reduced online using feedback, and by adding a regulated amount to the q-axis current, the torque of the variable magnetization machine 10 can be maintained constant or substantially constant.

Figure 7:
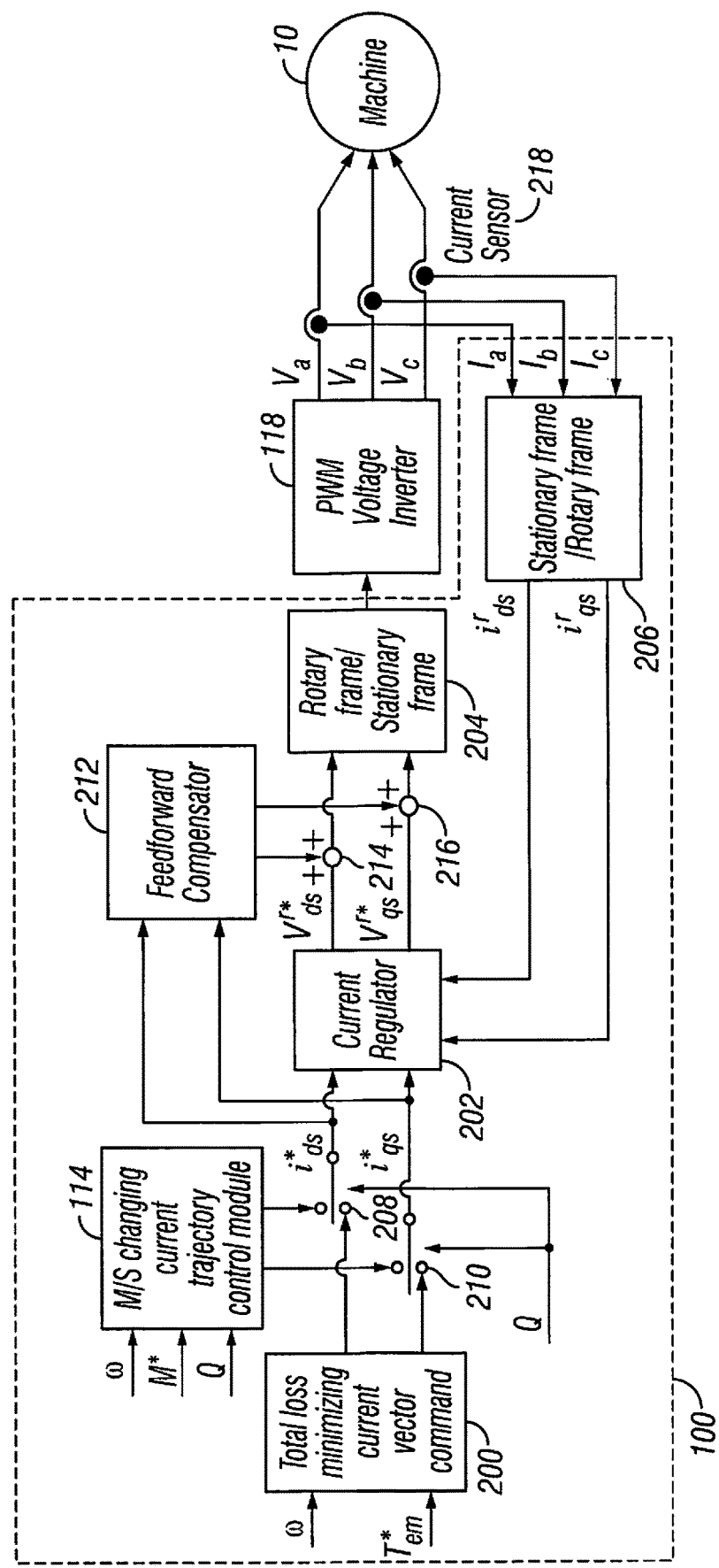
FIG. 7 is a block diagram illustrating an example of components of a controller employed in the configuration shown in FIGS. 2 through 4 according to a disclosed embodiment.

As shown in FIG. 7, the controller 100 in this example includes a total loss minimizing current vector command module 200, a current regulator 202, a rotary frame/stationary frame component 204, and a stationary frame/rotary frame component 206. In this example, the output of the rotary frame/stationary frame component 204 is coupled to the e-powertrain and, in particular, to the inverter arrangement 118 which provides power to the variable magnetization machine 10.

As can be appreciated by one skilled in the art, the controller 100 preferably includes at least one microcomputer with a control program that controls the components of the controller 100 as discussed below. Thus, the microcomputer or microcomputers can be configured and programmed to embody any or all of the total loss minimizing current vector command module 200, the current regulator 202, the rotary frame/stationary frame component 204, and the stationary frame/rotary frame component 206 The controller 100 includes other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the controller 100 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. Furthermore, the controller 100 can communicate with the variable magnetization machine 10 in any suitable manner as understood in the art. In addition, although several of the components of the controller 100 are described as modules, these components need not be individual or separate components, and one component or module can perform the operations of multiple components or modules discussed herein. Also, each module can include a microcontroller as discussed above or multiple modules can share one or more microcontrollers.

As further shown in FIG. 7, the total loss minimizing current vector command module 200 receives a torque command $T^*_{em}$ and a sensed or estimated rotational speed signal ω of the rotor 12 from, for example, a controller (not shown) in response to, for example, a driver of the vehicle attempting to accelerate the vehicle 102. In response, the total loss minimizing current vector command module 200 outputs a d-axis current signal i*$_{ds}$ and a q-axis current signal i*$_{qs}$ for selecting the optimum d-axis current i$_d$ and the optimum q-axis current i$_q$. That is, in this example, the total loss minimizing current vector command module 200 outputs the d-axis current signal i*$_{ds}$ to a switch 208 and the q-axis current signal i*$_{qs}$ to a switch 210. Switches 208 and 210 are controlled by an M/S change flag signal Q to achieve the effects described herein.

The M/S changing current trajectory control module 114 receives the sensed or estimated rotational speed signal ω, as well as a target magnetization state signal M* (also referred to as the actual M/S signal as discussed above with regard to FIG. 3) and the M/S change flag signal Q. Accordingly, depending on the state of the M/S change flag signal Q, switch 208 will be controlled to provide the d-axis current command signal i*$_{ds}$ from either the output provided by the total loss minimizing current vector command module 200 or the output provided by the M/S changing current trajectory control module 114 to the current regulator 202 and a feedforward compensator 212. Similarly, depending on the state of the M/S change flag signal Q, the switch 210 provides the q-axis current command signal i*$_{qs}$ from either the output provided by the minimizing current vector command module 200 or the output provided by the M/S changing current trajectory control module 114 to the current regulator 202 and the feedforward compensator 212. The M/S change flag signal Q is provided by the M/S selection strategy (Hysteresis control) 113 shown in FIG. 3. The M/S change flag signal Q takes a high value when M/S is to be changed. Thus, the M/S change flag signal Q switches the switches 208 and 210 so that the output provided by the M/S changing current trajectory control module 114 is provided to the current regulator 202 and the feedforward compensator 212. The controller 100 further includes adders 214 and 216. The adder 214 adds the output from the feedforward compensator 212 to the d-axis current voltage signal V$^{r*}_{ds}$ output from the current regulator 202, and provides the sum of the addition to the rotary frame/stationary frame component 204. The adder 216 adds the output from the feedforward compensator 212 to the q-axis current voltage signal V$^{r*}_{qs}$ and provides the sum of the addition to the rotary frame/stationary frame component 204. In this example, the rotary frame/stationary frame component 204 provides the voltage signals to the inverter arrangement 118, which provides voltages V$_a$, V$_b$ and V$_c$ to the three poles of the variable magnetization machine 10.

As further shown in FIG. 7, current sensors 218 sense the currents associated with V$_a$, V$_b$ and V$_c$ being applied to the variable magnetization machine 10. The current sensors 218 provide the sensed current signals I$_a$, I$_b$ and I$_c$ to the stationary frame/rotary frame component 206. The stationary frame/rotary frame component 206 thus provides a detected d-axis current signal i$^r_{ds}$ and a detected q-axis current signal i$^r_{qs}$ to the current regulator 202. As understood in the art, the current regulator 202 regulates the d-axis current voltage signal V$^{r*}_{ds}$ and q-axis current voltage signal V$^{r*}_{qs}$ based on the detected d-axis current signal i$^r_{ds}$ and the detected q-axis current signal i$^r_{qs}$ that are fed back from the stationary frame/rotor frame component 206.

Examples of operations performed by the controller 100 for reducing the voltage induced by a pulse current to a low enough level so that the inverter arrangement 118 can provide a sufficient voltage to drive the variable magnetization machine 10 even at a high speed will now be described.

Figure 8:
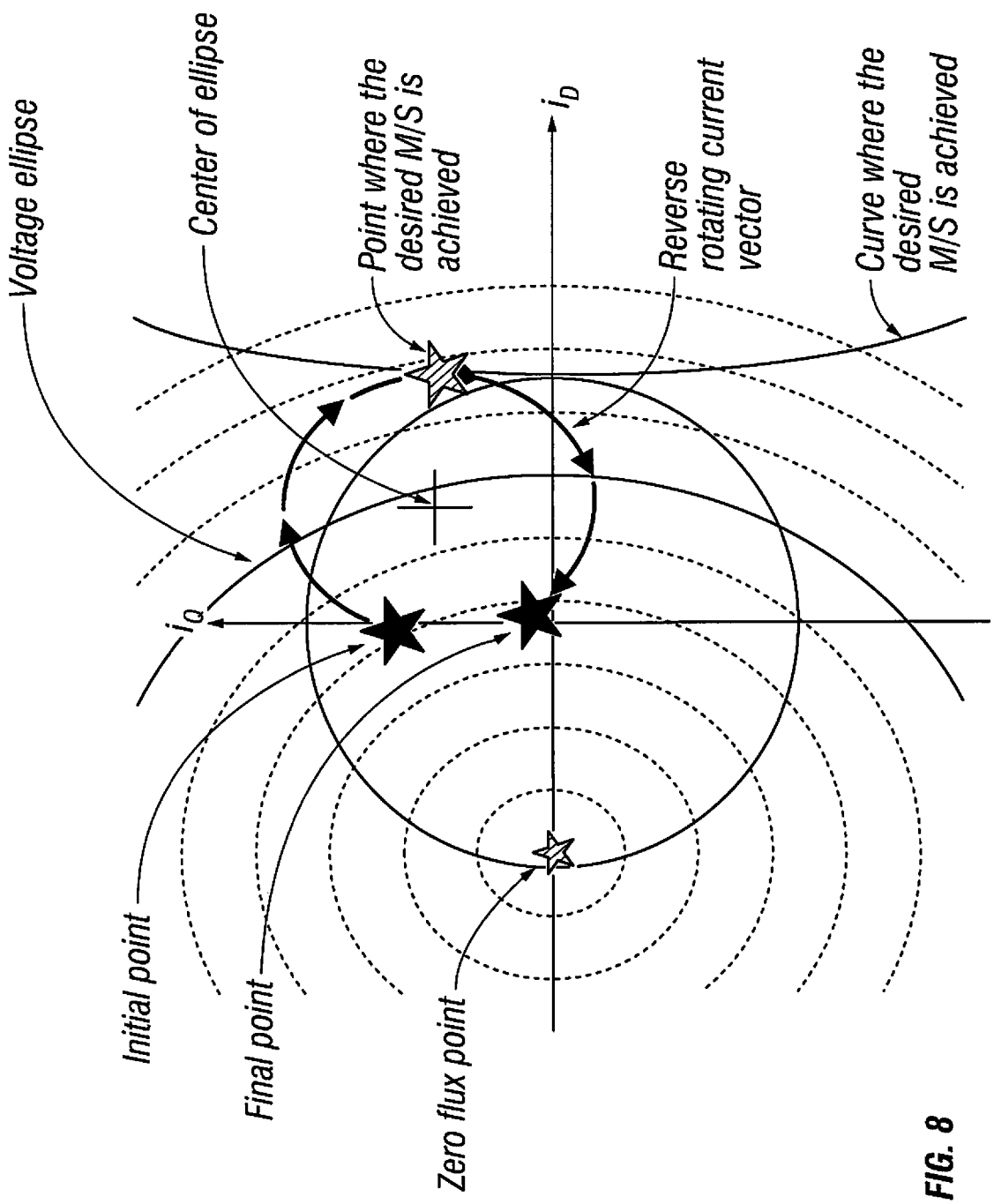
FIGS. 8 through 10 are graphs illustrating an example of the relationship between the driving voltage which drives the variable magnetization machine with respect to a current coordinate system with the q-axis current $i_q$ being on the vertical axis and the d-axis current $i_d$ being on the horizontal axis.
Figure 9:
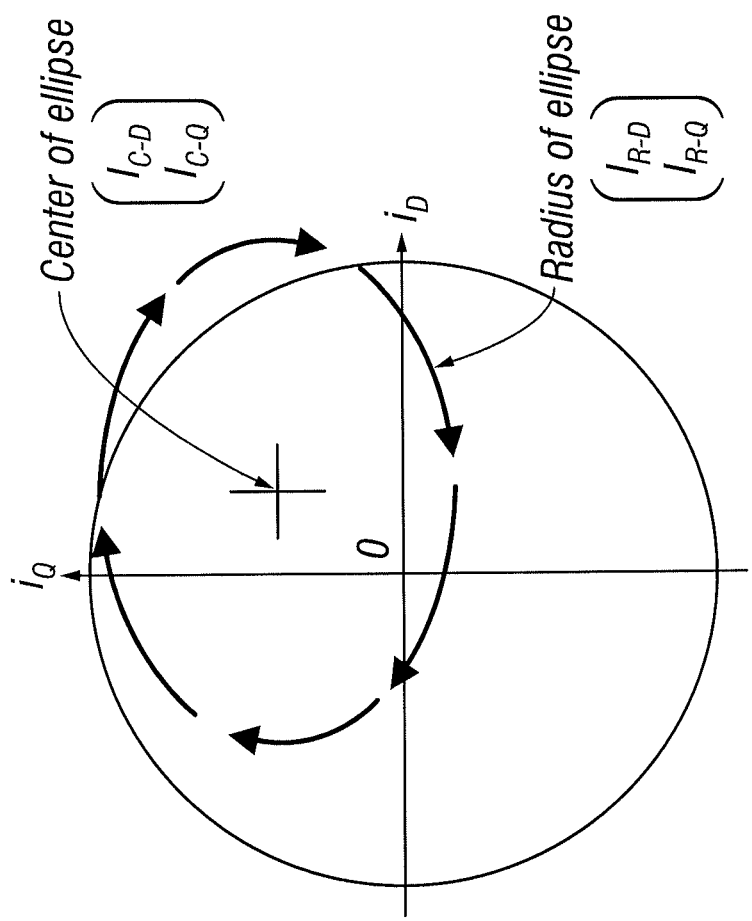
Figure 10:
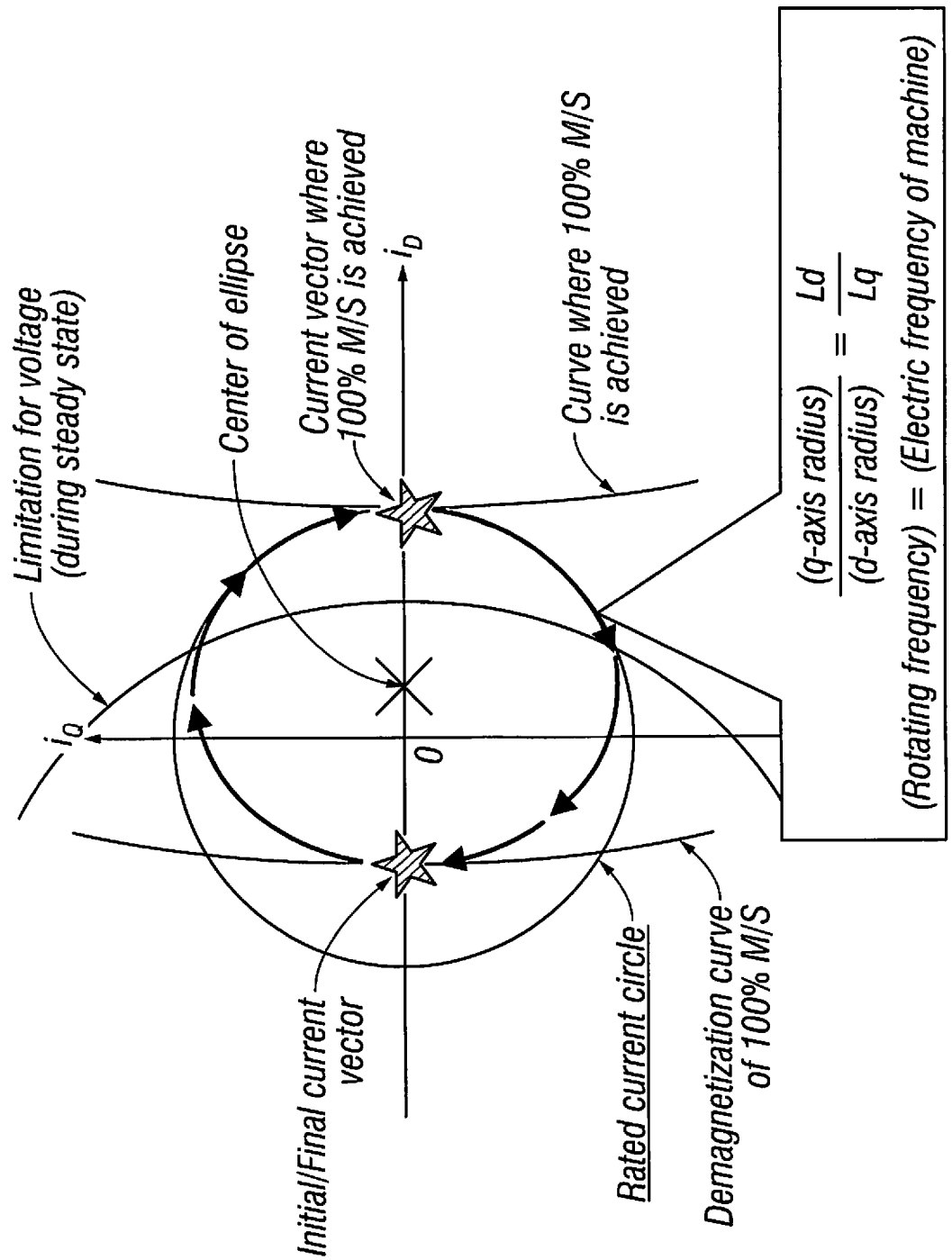

FIGS. 8 and 9 illustrate an example of the relationship between the driving voltage which drives the variable magnetization machine 10 with respect to a current coordinate system with the q-axis current i$_q$ being on the vertical axis and the d-axis current i$_d$ being on the horizontal axis. As indicated, the voltage ellipse surrounds the zero flux point. A reverse rotating current vector can be plotted from an initial point beginning on the i$_q$ axis to a final point ending on the i$_q$ axis. As indicated, the reverse rotating current vector plot forms an ellipse between the initial and final points. Furthermore, the reverse rotating current vector ellipse intersects a desired M/S curve at an indicated point. The radius of the elliptical trajectory has a d-axis to q-axis ratio corresponding to a ratio Lq/Ld where Lq represents a q-axis inductance and Ld represents a d-axis inductance. As understood in the art, the driving voltage can be reduced due to the reverse rotating current vector.

That is, as further understood in the art, the d-axis voltage V$_D$ and the q-axis voltage V$_Q$ of the variable magnetization machine 10 can be defined by the following vector $$\begin{pmatrix} V_D \\ V_Q \end{pmatrix} = \begin{pmatrix} sL_D + R & -\omega L_Q \\ \omega L_D & sL_Q + R \end{pmatrix} \begin{pmatrix} I_D \\ I_Q \end{pmatrix} + \begin{pmatrix} s\Phi_{PM} \\ \omega\Phi_{PM} \end{pmatrix}$$

$$V_{L2L\_Peak} = \sqrt{3}\sqrt{V_D^2 + V_Q^2}$$

and the current for the reverse rotating elliptical path as shown in FIGS. 8 and 9 can be defined by the following matrix $$\begin{pmatrix} I_D \\ I_Q \end{pmatrix} = \begin{pmatrix} I_{R-D}\cos(-vt+\theta) + I_{C-D} \\ I_{R-Q}\sin(-vt+\theta) + I_{C-Q} \end{pmatrix}$$

where ν is the angular frequency (CW) for the elliptical path.

Combining these matrix and vector provides the following vector $$\begin{pmatrix} V_D \\ V_Q \end{pmatrix} = \begin{pmatrix} (vL_D I_{R-D} - \omega L_Q I_{R-Q})\sin(-vt+\theta) - \omega L_Q I_{C-Q} \\ (-vL_Q I_{R-Q} + \omega L_D I_{R-D})\cos(-vt+\theta) + \omega L_D I_{C-D} + \omega\Phi_{PM} \end{pmatrix}$$

The following values can be assumed:

$$\begin{cases} v = \omega \\ L_D I_{R-D} = L_Q I_{R-Q} = \psi_C \end{cases}$$

where Ψ$_C$ is the radius of operating point in d- and q-axis flux plane, and ω is the electric angular frequency of the variable magnetization machine 10. By substituting these values into the above matrix, the voltages V$_D$ and V$_Q$ can be represented as follows $$\begin{pmatrix} V_D \\ V_Q \end{pmatrix} = \begin{pmatrix} -\omega L_Q I_{C-Q} \\ \omega L_D I_{C-D} + \omega\Phi_{PM} \end{pmatrix}$$

which indicates that the voltage is constant during the operation and is equal to that of a steady state value with an operation at the center of the reverse rotating current vector ellipse as shown in FIGS. 8 and 9. The center of the reverse rotating current vector ellipse can be anywhere as long as the center is inside the voltage limit ellipse as shown.

Figure 11:
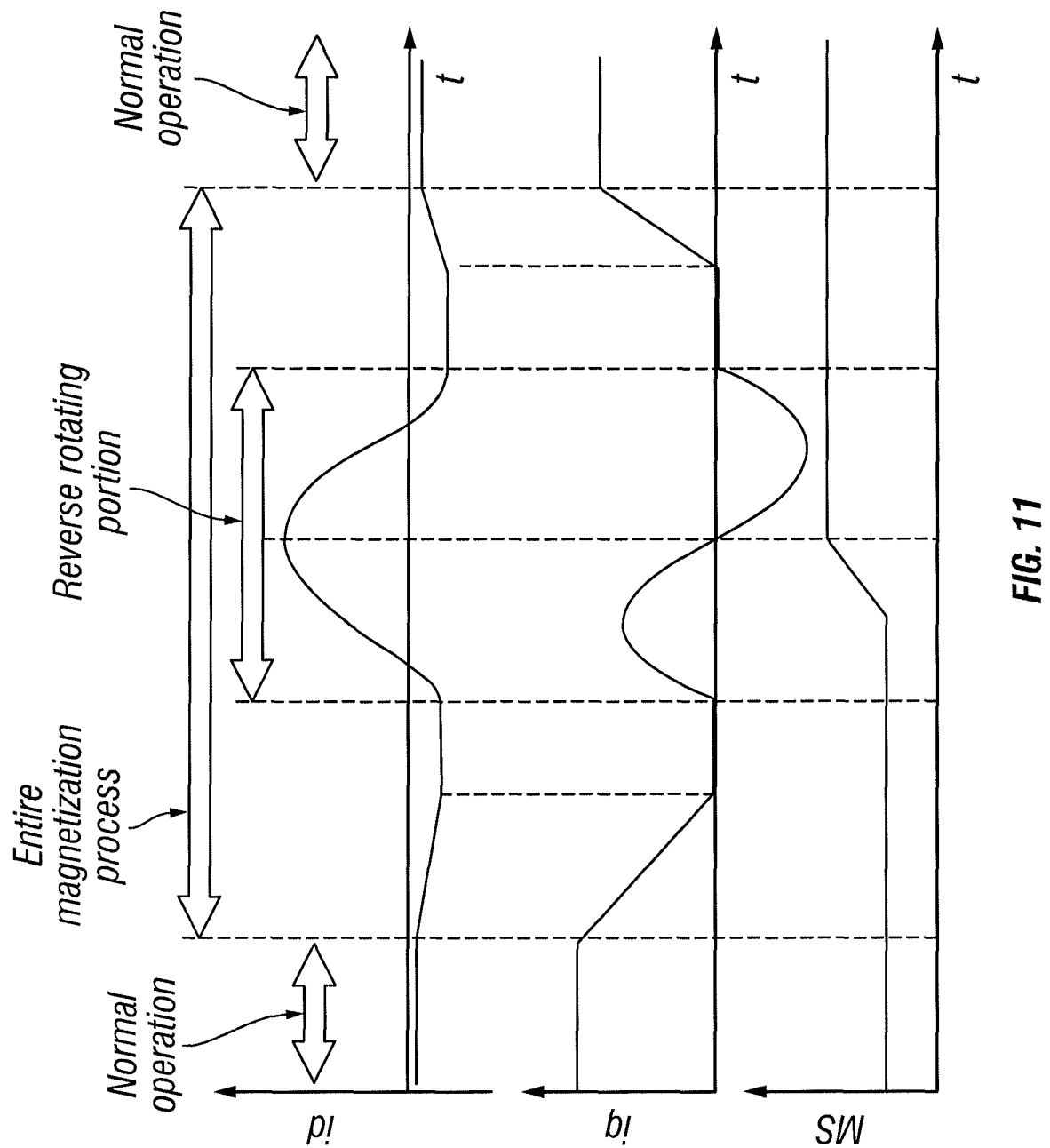
FIG. 11 are graphs illustrating an example of values of the d-axis current, the q-axis current and the magnetization state of the variable magnetization machine over time during a normal operation and a magnetization process which includes a reverse rotating process.
Figure 12:
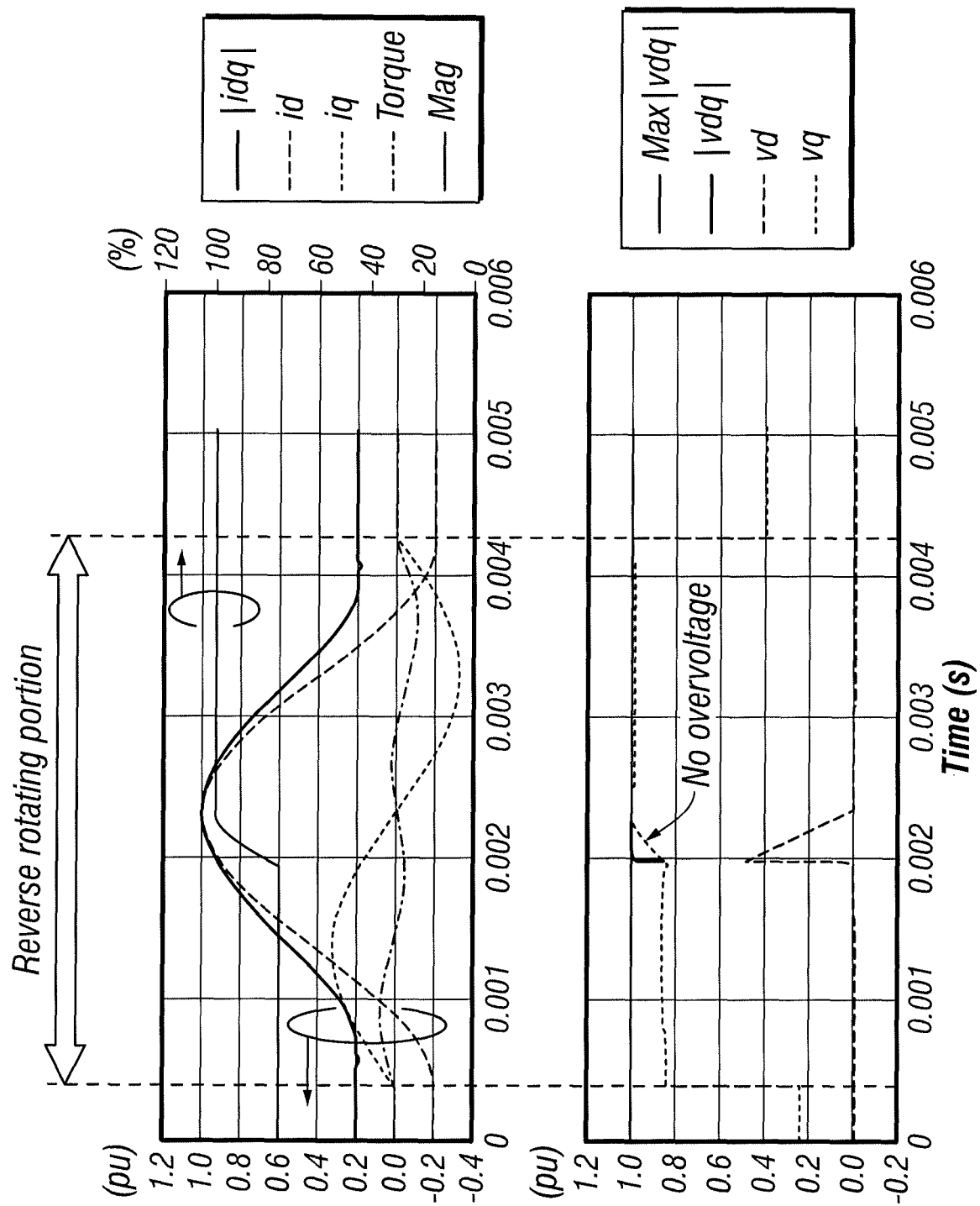
FIG. 12 is a graph illustrating an example of the d-axis voltage $v_d$ and the q-axis voltage $v_q$ with respect to a maximum combined voltage Max$|v_{dq}|$.
Figure 13:
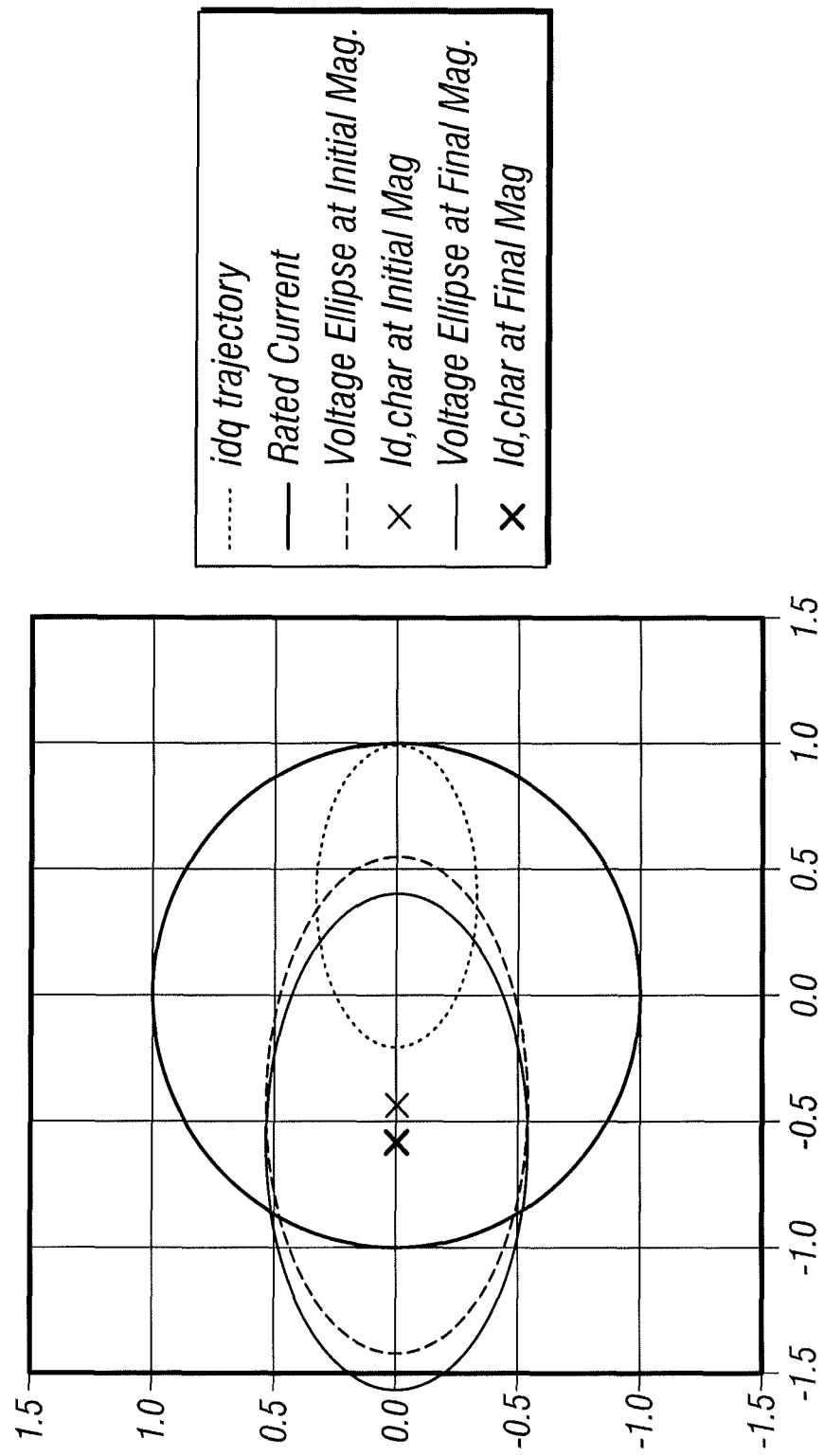
FIG. 13 further illustrates an example of the relationship between the voltage ellipses at the initial and final magnetizations, and the d-axis characteristic currents $i_{d,\ char}$ at the initial and final magnetizations.
Figure 14:
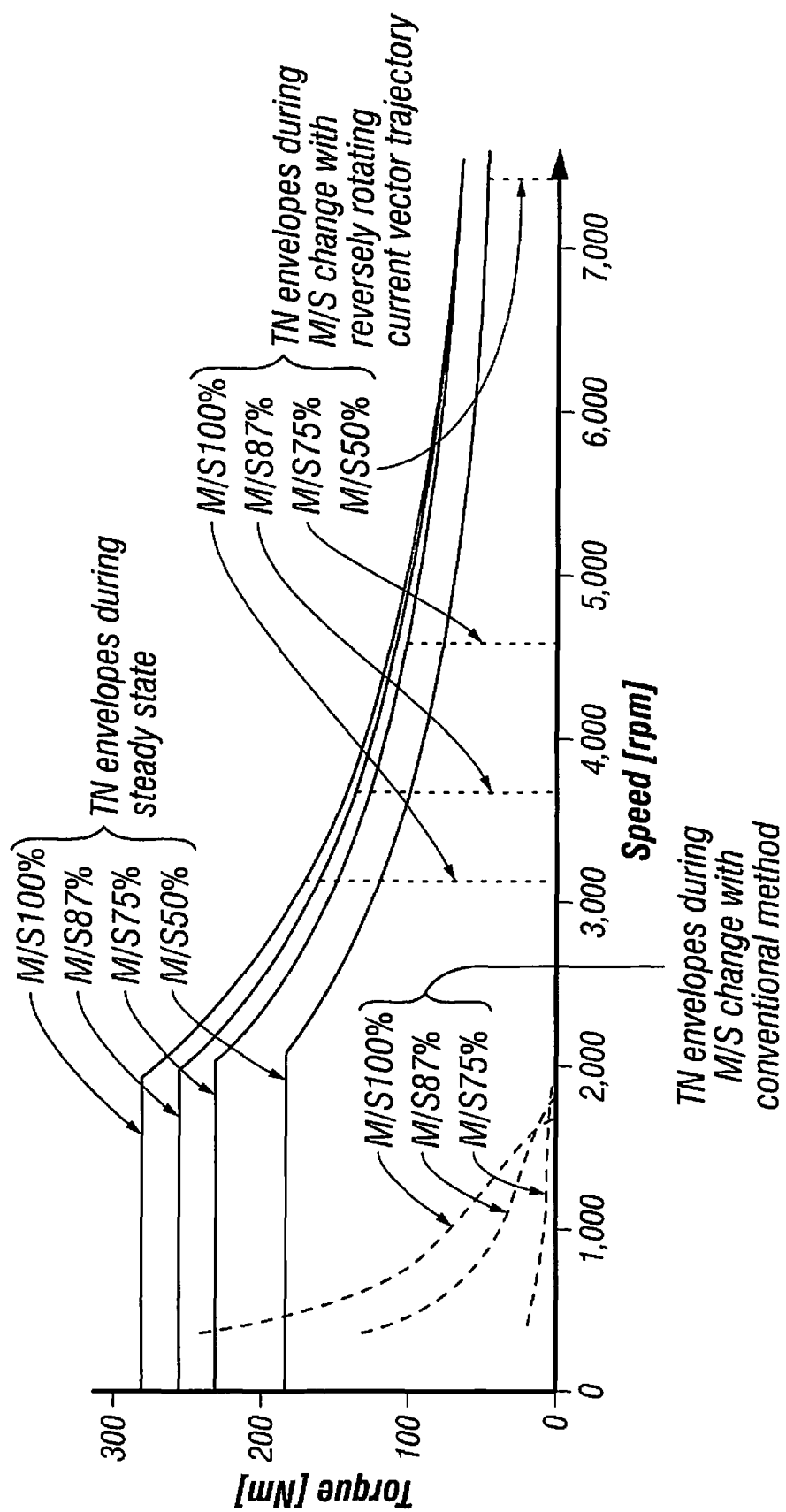
FIG. 14 illustrates an example of the manner in which the operating envelopes of the torque and speed of the variable magnetization machine changes as the magnetization state M/S changes.

Accordingly, as shown in FIGS. 10 through 14, the controller 100 controls the operation of switches 208 and 210 (FIG. 7) to create a reverse rotating current vector that reduces the driving voltage while achieving a 100% magnetization state M/S for the variable magnetization machine 10. As indicated in FIG. 11, the reverse rotating current is generated during a certain period within the magnetization process of the variable magnetization machine 10. Thus, as shown in FIG. 12, the absolute value of the combined voltage $|v_{dq}|$ of the d-axis voltage $v_d$ and the q-axis voltage $v_q$ does not exceed the maximum combined voltage Max $|v_{dq}|$. As a result, the inverter arrangement 118 can still provide a sufficient voltage to drive the variable magnetization machine 10 even at a high speed. FIG. 13 further illustrates an example of the relationship between the voltage ellipses at the initial and final magnetizations, and the d-axis characteristic currents $i_{d, char}$ at the initial and final magnetizations. FIG. 14 illustrates an example of the manner in which the operating envelopes of the torque and speed of the variable magnetization machine 10 changes as the magnetization state M/S changes.

Figure 15:
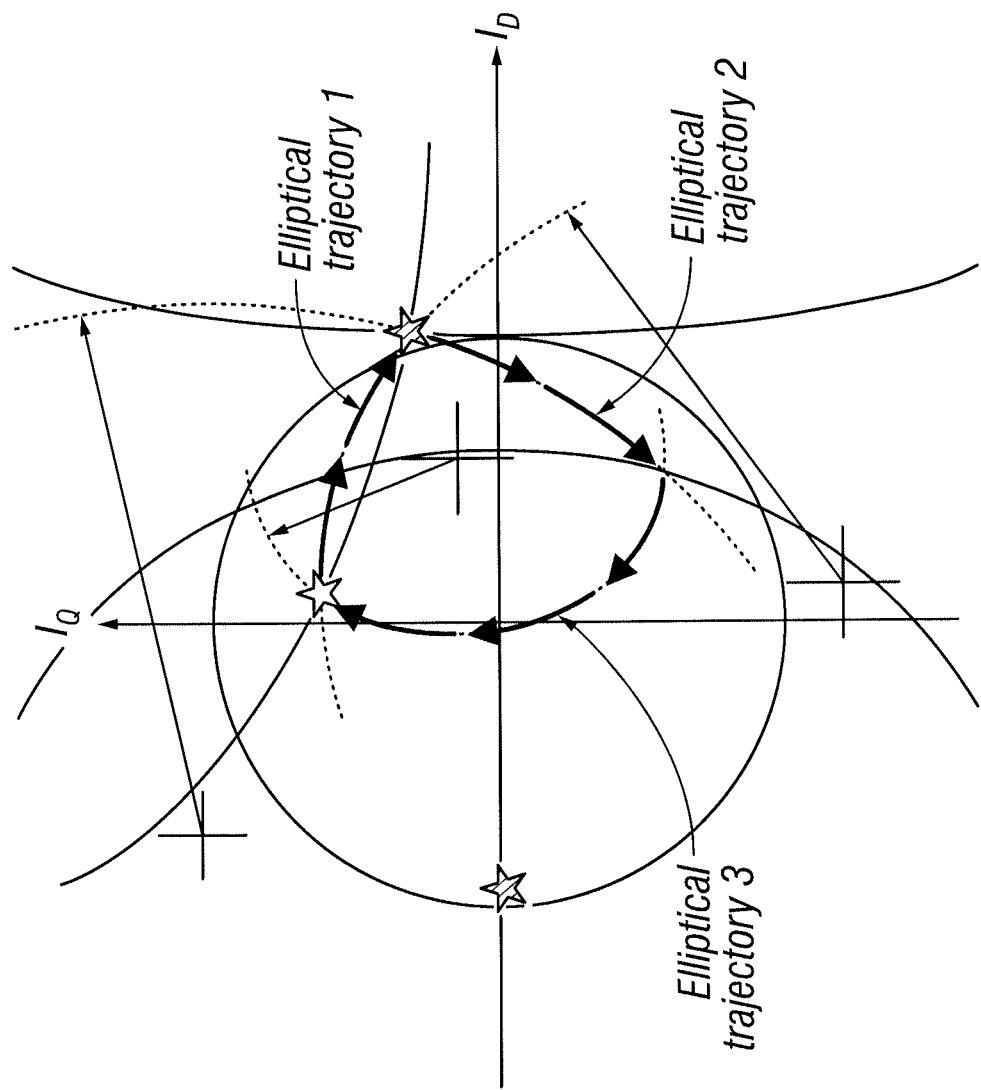
FIGS. 15 and 16 illustrate examples of a combination of multiple reverse rotating current ellipses to provide different elliptical trajectories.
Figure 16:
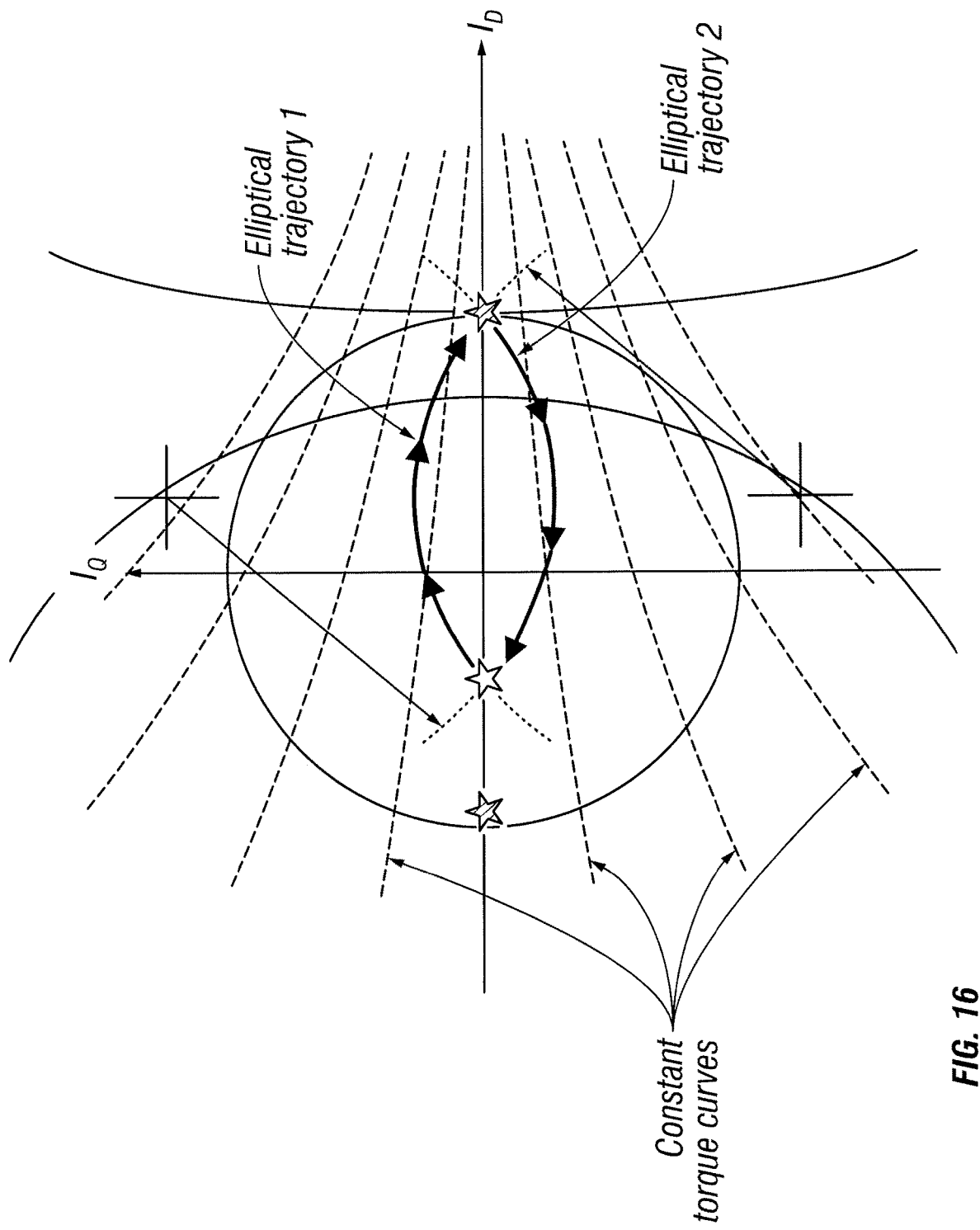

In addition, as shown in FIG. 15, the controller 100 can control the operation of switches 208 and 210 (FIG. 7) to combine multiple reverse rotating current ellipses to provide different elliptical trajectories while still achieving the above effect of reducing the combined voltage $|v_{dq}|$ of the d-axis voltage $v_d$ and the q-axis voltage $v_q$ to not exceed the maximum combined voltage Max $|v_{dq}|$. As shown in FIG. 16, the controller 100 can control the operation of switches 208 and 210 (FIG. 7) to combine multiple reverse rotating current ellipses for a smaller torque ripple to provide different elliptical trajectories while still achieving the above effect of reducing the combined voltage $|v_{dq}|$ of the d-axis voltage $v_d$ and the q-axis voltage $v_q$ to not exceed the maximum combined voltage Max $|v_{dq}|$.

Figure 17:
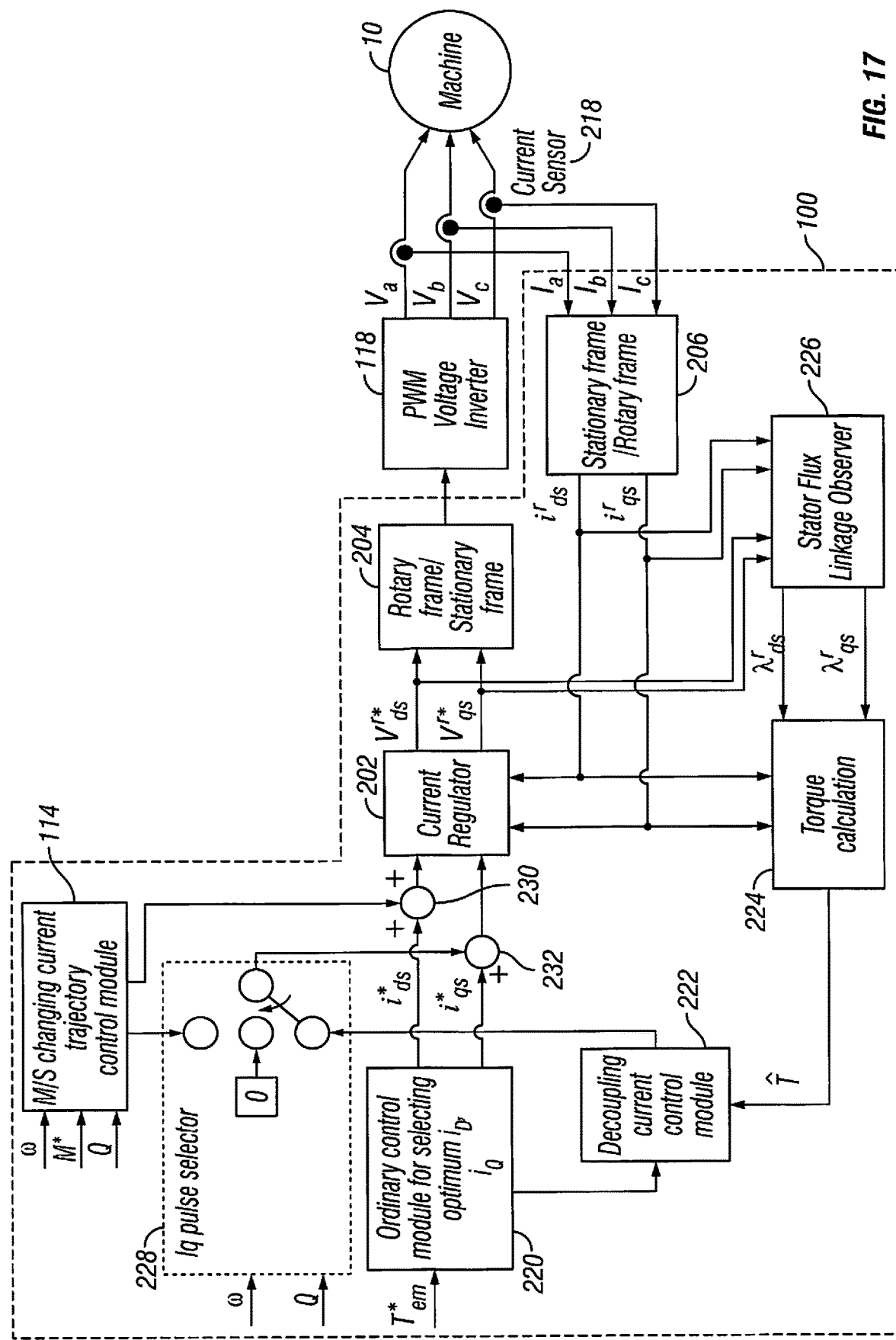
FIG. 17 is a block diagram illustrating an example of components of a controller employed in the configuration shown in FIGS. 2 through 4 according to another disclosed embodiment.

As shown in FIG. 17, the controller 100 according to another embodiment can include an ordinary control module 220 instead of the total loss minimizing current vector command module 200 as discussed above. The controller 100 can further be configured to include a decoupling current control module 222, a torque calculator 224, a stator flux linkage observer 226 and an Iq pulse selector 228. Furthermore, instead of switches 208 and 210, this arrangement includes adders 230 and 232. The outputs of adders 230 and 232 are provided to the current regulator 202 as indicated.

The stator flux linkage observer 226, which can also be referred to as a stator flux linkage estimator, can be configured to estimate the stator flux linkage by adding a compensation value that is obtained from an L(Y-Yh) reference in a Luenburger style observer for machine electrical state variables associated with the variable magnetization machine 10. This can provide more accurate torque estimation, and reduce pulsating torque. In this example, the stator flux linkage observer 226 receives the detected d-axis current signal $i^r_{ds}$ and the detected q-axis current signal $i^r_{qs}$ and provides estimated stator flux linkage signals $\lambda^r_{ds}$ and $\lambda^r_{qs}$ to the torque calculator 224. The torque calculator 224 calculates the value of a sensed or estimated torque T^ based on the estimated stator flux linkage signals $\lambda^r_{ds}$ and $\lambda^r_{qs}$, the detected d-axis current signal $i^r_{ds}$ and the detected q-axis current signal $i^r_{qs}$ that are fed back from the stationary frame/rotary frame component 206.

The ordinary control module 220 and the decoupling current control module 222 receive a torque command $T^*_{em}$ from, for example, a controller (not shown) in response to, for example, a driver of the vehicle attempting to accelerate the vehicle. In response, the ordinary control module 220 outputs a d-axis current signal $i^*_{ds}$ and a q-axis current signal $i^*_{qs}$ for selecting the optimum d-axis current $i_d$ and the optimum q-axis current $i_q$. Thus, the ordinary control module 220, which can also be referred to as a current command module, computes a vector current command in a dq axis based on a torque command $T^*_{em}$. The decoupling current control module 222 in this example computes the reducing current based on a difference between the torque command $T^*_{em}$ and the estimated torque T^ provided by the torque calculator 224. As further shown, the decoupling current control module 222 provides the reducing current to the Iq pulse selector 228. Thus, the controller 100 can control the Iq pulse selector 228 to provide the output from the M/S changing current trajectory control module 114 to the adder 232, the decoupling current from the decoupling current control module 222 to the adder 232, or a value of 0 to the adder 232 as indicated to adjust the value of the q-axis current signal $i^*_{qs}$ as desired to attain the type of reverse rotating current ellipses discussed herein. The Iq pulse selector 228 selects which input signal to be output according to the M/S change flag signal Q and the rotational speed signal ω indicating the rotational speed of the variable magnetization machine 10. When the M/S change flag signal Q is low, that is, not during an M/S change period, the Iq pulse selector 228 outputs a zero since no additional q-axis current $i_q$ is required for the variable magnetization machine 10. When the M/S change flag signal Q is high and the rotational speed signal ω indicates that the rotational speed of the variable magnetization machine 10 is low, the Iq pulse selector 228 outputs the output that is provided by the decoupling current control module 222. When the M/S change flag signal Q is high and the rotational speed signal ω indicates that the rotational speed of the variable magnetization machine 10 is high, the Iq pulse selector 228 outputs the output that is provided by the M/S changing current trajectory control module 114 to reduce the voltage output by the current regulator 202. Further details of the ordinary control module 220, the torque calculator 224 and the stator flux linkage observer 226 are disclosed in International Application No. PCT/US2013/048562 referenced above.

Figure 18:
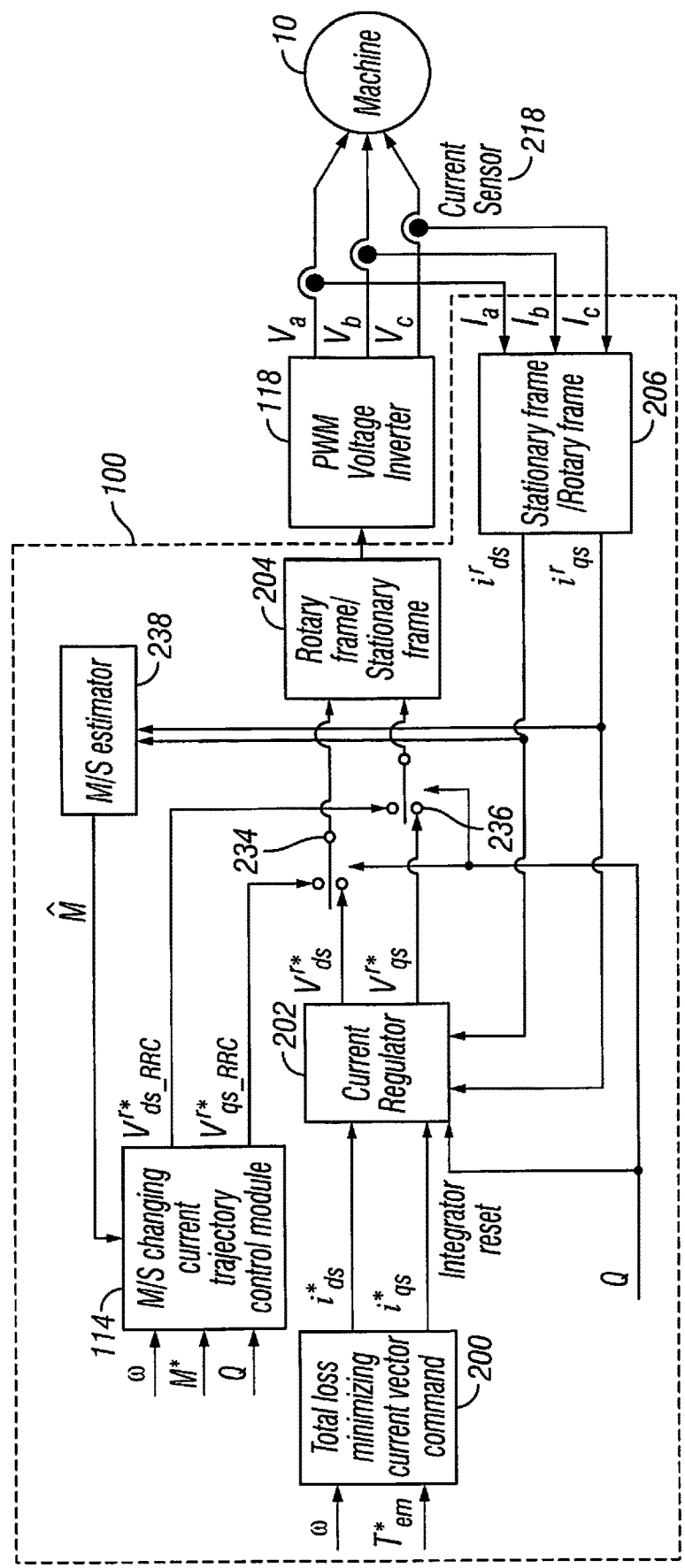
FIG. 18 is a block diagram illustrating an example of components of a controller employed in the configuration shown in FIGS. 2 through 4 according to a further disclosed embodiment.

As shown in FIG. 18, instead of including switches 208 and 210 as shown in FIG. 7, the controller 100 can include switches 234 and 236 which receive the outputs of the current regulator 202. Also, instead of including a feedforward compensator 212 as shown in FIG. 7, the controller 100 can include an M/S estimator 238 that estimates the magnetization state M/S of the variable magnetization machine 10 based on the detected d-axis current signal $i^r_{ds}$ and the detected q-axis current signal $i^r_{qs}$ provided by the stationary frame/rotary frame 206. The M/S estimator 238 thus provides an estimated magnetization signal M^ to the M/S changing current trajectory control module 114. Accordingly, depending on the state of the M/S change flag signal Q, switch 234 will be controlled to provide either the d-axis current voltage signal $V^{r*}_{ds\_RRC}$ received from the M/S changing current trajectory control module 114, or the d-axis current voltage signal $V^{r*}_{ds}$ received from the current regulator 202, to the rotary frame/stationary frame component 204. Similarly, depending on the state of the M/S change flag signal Q, switch 236 will be controlled to provide either the q-axis current voltage signal $V^{r*}_{qs\_RRC}$ received from the M/S changing current pulse control module 114, or the q-axis current voltage signal $V^{r*}_{qs}$ received from the current regulator 202, to the rotary frame/stationary frame 204. Thus, the controller 100 controls the switches 234 and 236 to alternate between providing an output of the open loop controller (the M/S changing current trajectory control module 114) and an output of the current regulator 202 to control the d-axis voltage and the q-axis voltage. The M/S change flag signal Q can also reset the current regulator as indicated. Thus, the controller 100 can deactivate at least one of an integrator and an accumulator in the current regulator 202 using the M/S change flag signal Q while the controller 100 controls the switches 234 and 236 to provide the output of the open loop controller to control the d-axis voltage and the q-axis voltage. Accordingly, the controller 100 as shown in FIG. 18 operates to attain the type of reverse rotating current ellipses discussed herein.

Figure 19:
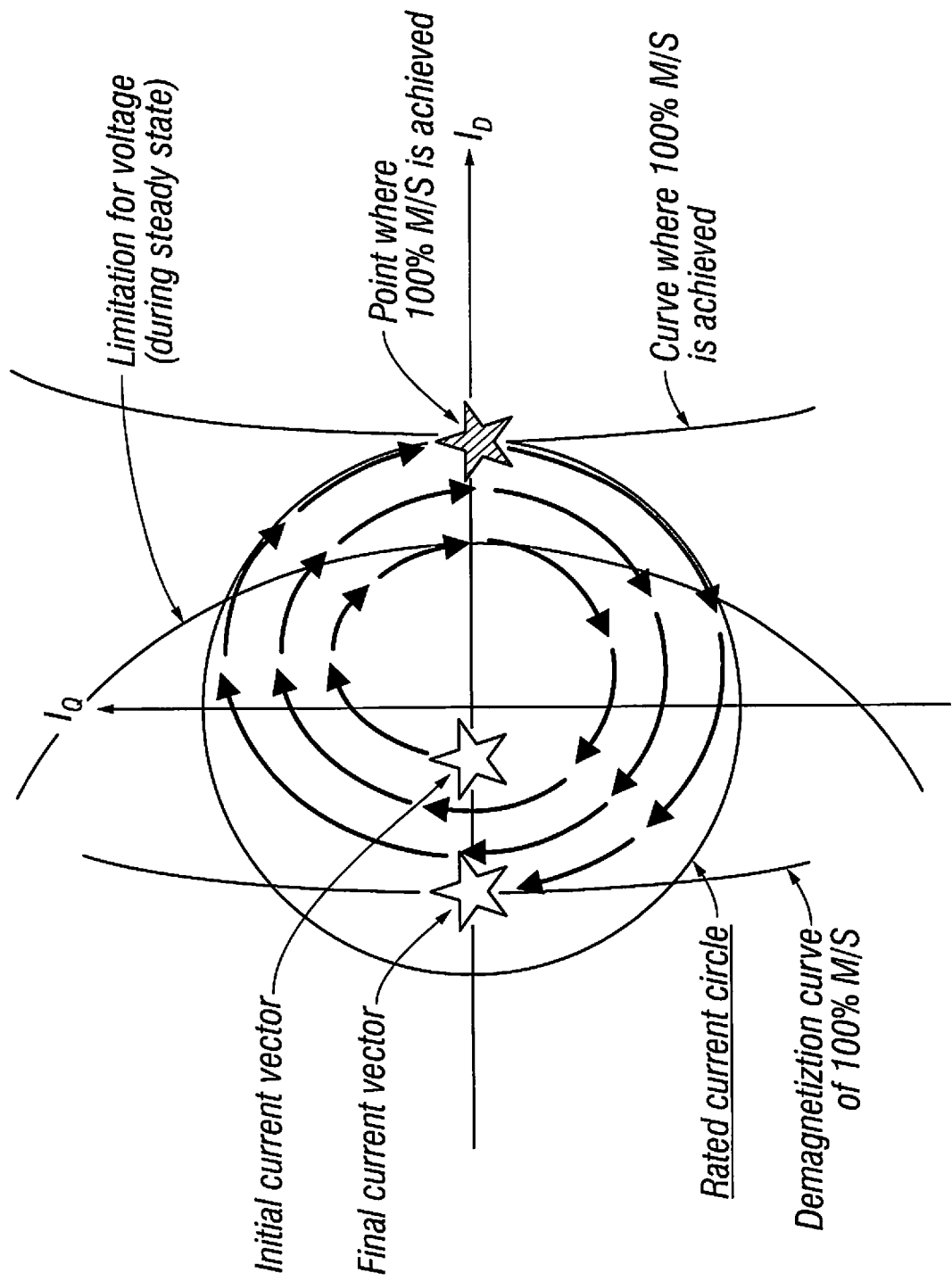
FIGS. 19 and 20 illustrate examples of a rotating current ellipse pattern of a reversely rotating d-axis/q-axis current vector trajectory which follows a spiral trajectory from the initial current vector to the final current vector.
Figure 20:
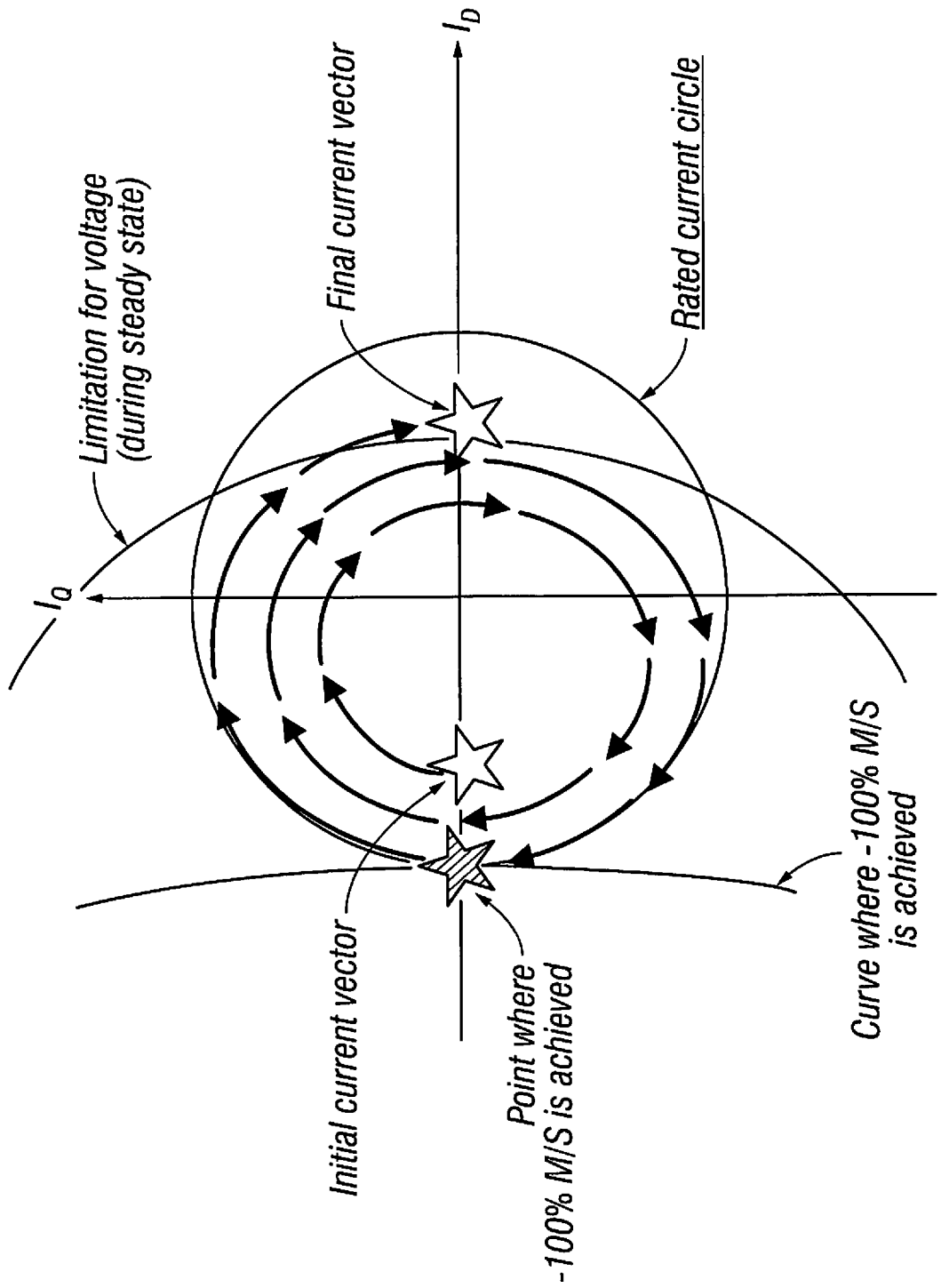

In addition, the embodiments of the controller 100 described herein can provide a rotating current ellipse pattern as shown in FIG. 19 which follows a spiral trajectory from the initial current vector to the final current vector, and intersects the curve where a 100% magnetization state M/S is achieved. The embodiments of the controller 100 described herein can provide a rotating current ellipse pattern for a reverse polarity variable magnetization machine 10. The rotating current ellipse pattern is similar to that shown in FIG. 19 and follows a spiral trajectory from the initial current vector to the final current vector, and intersects the curve where a 100% magnetization state M/S is achieved, as shown in FIG. 20.

As can be appreciated from the above, the embodiments of the controller 100 described herein that is capable of reducing the voltage induced by a pulse current to a low enough level so that the inverter can provide a sufficient voltage to drive the variable magnetization machine even at a high speed.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A variable magnetization machine control system comprising:
    a controller configured to determine a beginning of a change in a magnetization state of a variable magnetization machine, generate a reversely rotating d-axis/q-axis current vector trajectory while the change in the magnetization state of the variable magnetization machine is occurring to drive the variable magnetization machine at a predetermined speed while maintaining the driving voltage below a predetermined maximum magnitude, determine an ending of the change in the magnetization state, and discontinue generating the reversely rotating d-axis/q-axis current vector trajectory upon determining the ending of the change in the magnetization state,
    the reversely rotating d-axis/q-axis current vector trajectory including an elliptical trajectory in which q-axis current decreases after increasing as d-axis current increases and the q-axis current increases after decreasing as the d-axis current decreases.

2. The variable magnetization machine control system according to claim 1, wherein
    a radius of the elliptical trajectory has a d-axis to q-axis ratio corresponding to a ratio $L_q/L_d$ where $L_q$ represents a q-axis inductance and $L_d$ represents a d-axis inductance.

3. The variable magnetization machine control system according to claim 1, wherein
    the controller is configured to establish a reverse rotating frequency of the variable magnetization machine equal to an electric fundamental frequency of the variable magnetization machine.

4. The variable magnetization machine control system according to claim 1, wherein
    the controller is configured to generate a second reversely rotating d-axis/q-axis current vector trajectory having a second elliptical trajectory during the change in a magnetization state of the variable magnetization machine, and to combine the elliptical trajectory and the second elliptical trajectory to drive the variable magnetization machine at the predetermined speed while maintaining the driving voltage below the predetermined maximum magnitude.

5. The variable magnetization machine control system according to claim 1, wherein
    the controller comprises a torque regulator that is configured to switch between the torque regulator and the controller for a reversely rotating current vector trajectory based on an operating condition of the variable magnetization machine.

6. The variable magnetization machine control system according to claim 1, wherein the controller comprises an open loop controller which is configured to control a d-axis voltage and a q-axis voltage to generate the reversely rotating d-axis/q-axis current vector trajectory.

7. The variable magnetization machine control system according to claim 6, wherein
the controller further comprises a current regulator and a switch arrangement, and the controller is further configured to control the switch to alternate between providing an output of the open loop controller and an output of the current regulator to control the d-axis voltage and the q-axis voltage.

8. The variable magnetization machine control system according to claim 7, wherein
the controller is further configured to deactivate at least one of an integrator and an accumulator in the current regulator while the controller controls the switch to provide the output of the open loop controller to control the d-axis voltage and the q-axis voltage.

9. The variable magnetization machine control system according to claim 6, wherein
the controller is further configured to estimate the magnetization state of the variable magnetization machine based on a measured current from the variable magnetization machine and regulate the d-axis voltage and the q-axis voltage until the magnetization state corresponds to a desired magnetization state.

10. The variable magnetization machine control system according to claim 9, wherein
the controller is further configured to regulate the d-axis voltage and the q-axis voltage by initially decreasing the d-axis voltage and the q-axis voltage to initially decrease the magnetization state corresponding to a desired magnetization state.

11. The variable magnetization machine control system according to claim 9, wherein
the controller is further configured to regulate the d-axis voltage and the q-axis voltage by initially reversing a polarity of the d-axis voltage and the q-axis voltage.

12. The variable magnetization machine control system according to claim 1, wherein
the controller further comprises a current regulator and a voltage feedforward component.

13. The variable magnetization machine control system according to claim 1, wherein
the reversely rotating d-axis/q-axis current vector includes an initial point at which the q-axis current equals zero.

14. The variable magnetization machine control system according to claim 1, wherein
the reversely rotating d-axis/q-axis current vector includes an initial point and a final point which correspond to respective points along a demagnetization border of a desired magnetization state.

15. The variable magnetization machine control system according to claim 1, wherein
the reversely rotating d-axis/q-axis current vector includes a final point at which the q-axis current equals zero.

16. The variable magnetization machine control system according to claim 1, wherein
the reversely rotating d-axis/q-axis current vector includes a maximum point at which the q-axis current equals zero.

* * * * *